(12) United States Patent
Payton

(10) Patent No.: US 7,271,884 B2
(45) Date of Patent: *Sep. 18, 2007

(54) NATURAL FIBER SPAN REFLECTOMETER PROVIDING A VIRTUAL PHASE SIGNAL SENSING ARRAY CAPABILITY

(75) Inventor: Robert Michael Payton, Portsmouth, RI (US)

(73) Assignee: The United States of America represented by the Secretary of the Navy, Washington, DC (US)

( * ) Notice: Subject to any disclaimer, the term of this patent is extended or adjusted under 35 U.S.C. 154(b) by 297 days.

This patent is subject to a terminal disclaimer.

(21) Appl. No.: 11/056,629

(22) Filed: Feb. 7, 2005

(65) Prior Publication Data

US 2006/0028636 A1    Feb. 9, 2006

Related U.S. Application Data

(60) Provisional application No. 60/599,435, filed on Aug. 6, 2004.

(51) Int. Cl.
*G01N 21/00* (2006.01)

(52) U.S. Cl. .................................... 356/73.1
(58) Field of Classification Search ............... None
See application file for complete search history.

(56) References Cited

U.S. PATENT DOCUMENTS

| | | | |
|---|---|---|---|
| 4,817,101 A * | 3/1989 | Wyeth et al. ............... 372/32 |
| 5,194,847 A | 3/1993 | Taylor et al. |
| 6,043,921 A | 3/2000 | Payton |
| 6,285,806 B1 | 9/2001 | Kersey et al. |
| 6,597,821 B1 * | 7/2003 | Bohnert et al. ............... 385/12 |
| 6,630,658 B1 * | 10/2003 | Bohnert et al. .......... 250/227.14 |
| 6,700,655 B2 * | 3/2004 | Uchiyama et al. .......... 356/73.1 |

OTHER PUBLICATIONS

R. Hughes and J. Jarzynski, "Static Pressure Sensitivity Amplification in Interferometric Fiber-Optic Hydrophones", Applied Optics, Jan. 1, 1980, vol. 19., No. 1, USA.

* cited by examiner

*Primary Examiner*—Tu T. Nguyen
(74) *Attorney, Agent, or Firm*—James M. Kasischke; Michael P. Stanley; Jean-Paul A. Nasser

(57) ABSTRACT

A CW lightwave modulated by a continuously reiterated psuedorandom code sequence is launched into an end of a span of ordinary optical fiber cable. Portions of the launched lightwave back propagate to the launch end from a continuum of locations along the span because of innate fiber properties including Rayleigh scattering. This is picked off the launch end and heterodyned producing a r.f. beat signal. The r.f. beat signal is processed by a plurality (which can be thousands) of correlator type pseudonoise code sequence demodulation and phase demodulator units, operated in different time delay relationships to the timing base of the reiterated modulation sequences. These units provide outputs representative of phase variations in respective unique spectral components in the r.f. beat signal caused by acoustic, or other forms of, signals incident to virtual sensors at fiber positions corresponding to the various time delay relationships.

22 Claims, 13 Drawing Sheets

POLARIZATION STATE VARIABLES

E: WAVE AMPLITUDE (VOLTS/METER)
Θ: ROTATION ANGLE OF THE MAJOR AXIS
ψ: ELLIPTICITY ANGLE
Φ: WAVE TEMPORAL PHASE
ω: WAVE RADIAN FREQUENCY
ωt+Φ: INSTANTANEOUS ANGLE OF VECTOR

NATURAL FIBER SPAN REFLECTOMETER PROVIDING A VIRTUAL PHASE SIGNAL SENSING ARRAY CAPABILITY

CROSS-REFERENCE TO RELATED APPLICATIONS

Applicant claims the benefit of a provisional application, No. 60/599,435 which was filed on 6 Aug. 2004, and which is entitled "Fiber Span-Based Rayleigh Effect Sensor System with Enhanced Localization Capability" by Robert M. Payton.

"Natural Fiber Span Reflectometer Providing a Spread Spectrum Virtual Sensing Array Capability" (Navy Case No 96650) filed on even date herewith in the name of Robert M. Payton, hereby incorporated herein by reference in its entirety.

"Natural Fiber Span Reflectometer Providing A Virtual Signal Sensing Array Capability" (Navy Case No. 96517) filed on even date herewith in the name of Robert M. Payton, hereby incorporated herein by reference in its entirety.

"Natural Fiber Span Reflectometer Providing a Virtual Differential Signal Sensing Array Capability" (Navy Case No. 96519) filed on even date herewith in the name of Robert M. Payton, hereby incorporated herein by reference in its entirety.

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION (1) Field of the Invention

The present invention relates generally to the field of time-domain reflectometers. More specifically, it relates to such reflectometers which are a part of a photonic system application in which the object of the reflectometry is a span of fiber which has an interrogation signal launch end and a remote end. The invention enables the provision of a linear array of virtual sensors along the span. One particular type of application toward which the invention is directed are acoustic security alarm systems in which the span serves as a perimeter intrusion monitoring line.

(2) Description of the Prior Art

The U.S. Department of the Navy has been engaged in the development of towed acoustic arrays which are reflectometric systems in which the object of the reflectometry is a fiber span having an interrogation signal launch end and a remote end. One such development involves forming a towed array of acoustic sensors along the span by the costly process of irradiating Bragg reflective gratings into the fiber cable. These reflective gratings form the array of sensors of the reflectometry scheme of these systems. These towed arrays have a length of the order of at least 1.0 km, and the need to irradiate the fiber has resulted in the fiber spans costing hundreds of thousands of dollars each.

The Department of the Navy development activities have been further tasked to apply their creative efforts to homeland defense problems. As part of this effort there is under consideration the use of a reflectometer in which a fiber span is the object of the reflectometry. In this scheme, the fiber span provided with acoustic sensors would be used as an intrusion detector to monitor the perimeter of an area desired to be secure. The span lengths for this type of application include lengths of the order of 5 km, (links of a U.S. border protection network, oil line protection, chemical plant protection, etc.). In such perimeter monitoring applications thousands of acoustic sensors would be required along the fiber span.

The cost of manufacturing such perimeter monitoring spans employing reflective Bragg grating sensors has been an obstacle to their use in perimeter intrusion monitoring applications. Thus, there is considerable interest in the development of a reflectometer system in which a fiber span is the object of the reflectometry optic array that does not require the high cost of Bragg reflective acoustic sensors.

Previous effort in solving related problems are described by the following patents:

U.S. Pat. No. 5,194,847 issued Mar. 16, 1993 to H. Taylor and C. Lee discloses an apparatus for sensing intrusion into a predefined perimeter which comprises means for producing a coherent pulsed light, which is injected into an optical sensing fiber having a first predetermined length and positioned along the predefined perimeter. A backscattered light in response to receiving the coherent light pulses is produced and coupled into an optical receiving fiber. The backscattered light is detected by a photodetector and a signal indicative of the backscattered light is produced. An intrusion is detectable from the produced signal as indicated by a change in the backscattered light. To increase the sensitivity of the apparatus, a reference fiber and interferometer may also be employed.

U.S. Pat. No. 6,285,806 issued on Sep. 4, 2001 to A. Kersey et al., discloses an apparatus and method for measuring strain in an optical fiber using the spectral shift of Rayleigh scattered light. The interference pattern produced by an air gap reflector and backscatter radiation is measured. Using Fourier Transforms, the spectrum of any section of fiber can be extracted. Cross correlation with an unstrained measurement produces a correlation peak. The location of the correlation peak indicates the strain level in the selected portion of optical fiber.

The above patents do not show how to obtain signals representing acoustic pressure signals incident upon a fiber span (to detect perimeter intrusion) at a very large number of sensing stations without involving high manufacturing costs. Consequently, those skilled in the arts will appreciate the present invention which addresses these and other problems.

SUMMARY OF THE INVENTION

The objects of the present invention include the provision of:

(1) A time-domain reflectometer wherein an optical fiber span is the object of the reflectometry, and which provides output signals representative of acoustic pressure waves incident the span solely by virtue of the natural, or innate, properties of commercial grade optical fiber cables.

(2) The reflectometer described in object number (1), above, capable of providing acoustic wave signal sensing lengths of 5.0 km or more.

(3) The reflectometer described in object number (2), above, which facilitates the provision of a very large plurality (e.g. 5,000 or more) virtual acoustic sensors along the span.

(4) The reflectometer described in object number (1), above having a mode of operation which inherently attenuates undesired noises due to span line discontinuities, such as reflections caused by fiber cable couplings.

(5) The reflectometer described in objects numbered (1) through (4), above, having special utility as a perimeter intrusion monitoring line for an acoustic security alarm system.
(6) The reflectometer described in object numbered (1), above, which is capable of providing output signals in the form of a phase signal which varies linearly with the acoustic pressure wave.
(7) The reflectometer described in object numbered (3), above, which is capable of providing output signals in the form of phase differential signals across pairs of the virtual sensors.
(8) The reflectometer described in the object number (7), above, providing a capability of programmably selecting a pair, or pairs, of virtual acoustic sensors across which the phase signals are picked off, from among the plurality of virtual signals along the span.

These and other objects, features, and advantages of the present invention will become apparent from the drawings, the descriptions given herein, and the appended claims. However, it will be understood that the above listed objects and advantages of the invention are intended only as an aid in understanding aspects of the invention, and not intended to limit the invention in any way, and do not form a comprehensive list of objects, features, and advantages.

Accordingly, a time-domain reflectometer is provided for sensing and providing output signals representative of acoustic wave signals incident on the fiber span which is the object of the reflectometry, wherein the innate properties of low cost, commercially available fiber optic cables are employed to create a plurality (upwardly extending to very large numbers, e.g., 5000 and more) virtual sensors.

The present invention is implemented as follows: Time and spatial domain multiplexing and de-multiplexing of optical signals is accomplished by an electronic-delay or time of-transversal-delay coupled with modulated-retransmission of a master or reference carrier wave. Each individual optical signal occupies a unique time-delay slot or bin. A master or carrier wave is modulated with each individual optical signal and delayed by the appropriate time interval specific to a particular signal. All such signals are combined and simultaneously transmitted as a composite optical signal to a receiver where these are collected and photodetected. By correlating the photodetected composite optical signal with the master or reference carrier wave, each individual optical signal is sorted or demultiplexed into separate electronic signal channels. The continuous wave nature of the master or reference carrier wave provides more power than a pulsed optical wave and heterodyne optical reception of the invention allows a very low optical detection threshold or noise floor. The invention provides significant improvement over other systems because the optical noise floor is lowered considerably over more conventional means.

The invention applies to several applications. The invention allows audio bandwidth (tens of kilohertz bandwidth) providing time-domain reflectometry measurements of fiber optical cables or other optical mediums such as glass, air, water, etc. Other time-domain reflectometry methods do not sample the optical medium fast enough to detect tens of kilohertz bandwidth variations in the medium. The invention also relates to fiber optic sensors and optical sensors generally. A fiber optic sensor array is typically time-domain multiplexed by the time-of-transversal of an interrogation lightwave to each sensor and back to a common optical collection and detection point. The invention relates generally to both amplitude and phase type optical senor arrays.

The invention is an enabling technology for a Department of Navy development known as the Rayleigh Optical Scattering and Encoding (ROSE) sensor system. The spatial separation of segmentation of a ROSE acoustic array into spatial channels is enabled by the invention.

The invention relates to acoustic security alarm systems, Naval towed arrays for sensing underwater acoustic signals, fiber optic bugging devices, and many other potential ROSE applications. The invention also relates to non-fiber optical sensors such as: laser velocimeters; lasers imagers; laser radar; laser rangers; and remote laser acoustic, strain, motion or temperature measurement devices.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawing, wherein like reference numerals refer to like parts and wherein.

Figure 1:
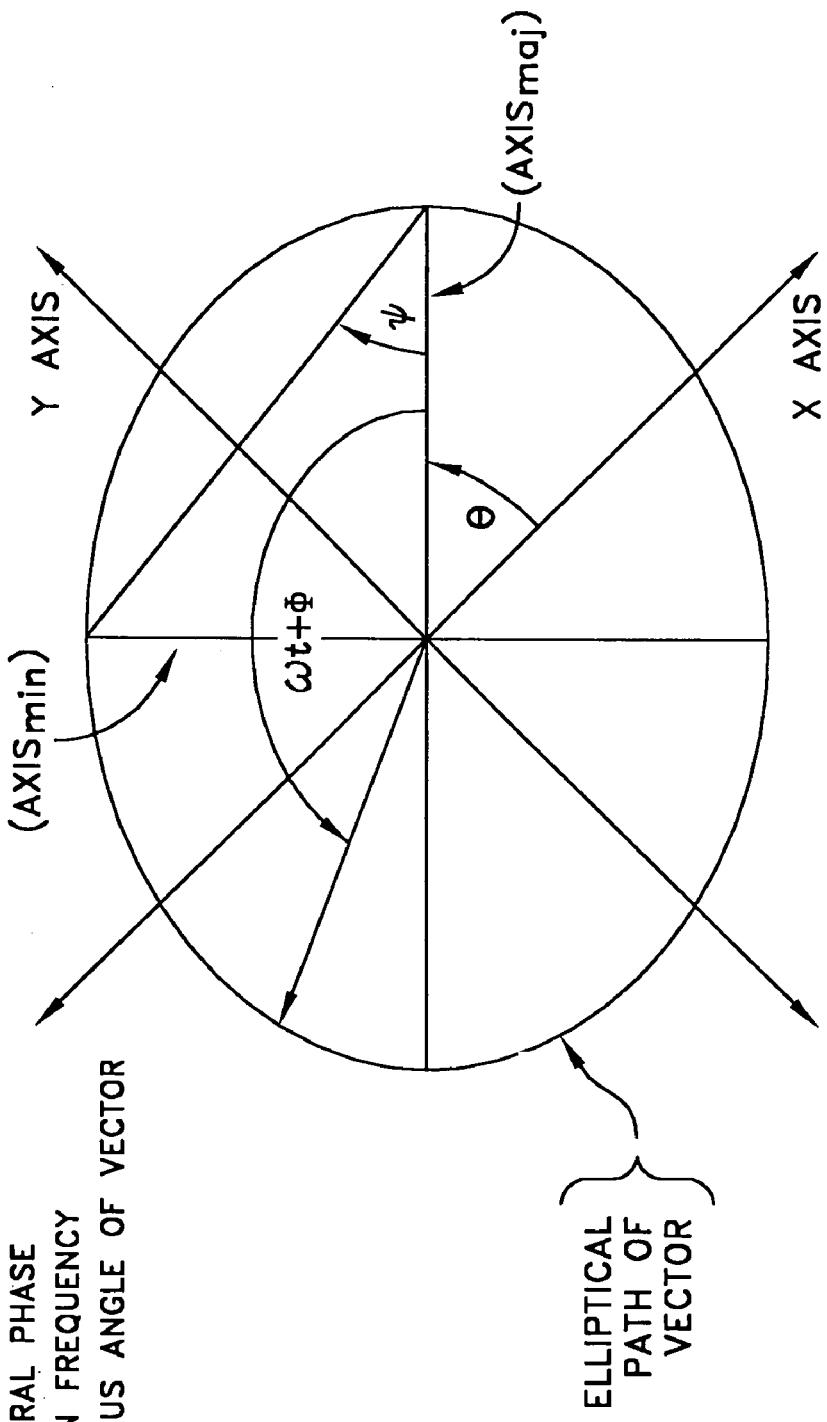
FIG. 1 is a graphical depiction of certain underlying physical mechanisms of polarization.

DESCRIPTION OF THE PREFERRED EMBODIMENT (1) Description of Underlying Theories a. Heterodyne Optical Detection Optical receivers are built around photodetectors which detect optical power rather than instantaneous electric field. Typically the photodetector output current is proportional to the incident optical power. This relationship severely limits the dynamic range of an incoherent optical receiver because for every decibel of optical power lost in a receiver system two decibels of receiver output current is lost. The square law characteristics of photodetectors limits typical incoherent optical receivers (often called video detection receivers) to dynamic ranges of less than 80 dB and optical detection noise floors to greater than −80 dBm per Hertz bandwidth. As illustration, suppose an electric field $E_S(t)$ [volt/meter] immersed in a material of impedance η [Ohms] impinges upon a photodetector of responsivity $\Re$ [ampere/watt] loaded by resistor $R_1$ and amplified by amplification A, then the optical power $P_S$ by amplification A, is:

$$P_S(t) = \frac{\langle \vec{E}_S(t) \cdot \vec{E}_S(t) \rangle}{\eta} \quad (1)$$

The photodetector output current [amperes] is:

$$i(t) = \Re P_S(t) \quad (2)$$

The photoreceiver output [volts] is thus:

$$v(t) = AR_L i(t) = AR_L \Re P_S(t) \quad (3)$$

The output fades only if the optical signal power goes to zero because the vector dot product of an optical signal against itself has no polarization or phase effects. This lack of fading due to polarization or phase comes at a cost: phase information is lost and signal to noise ratios are severely impacted.

A coherent optical receiver takes advantage of the square law characteristics of photodetectors. A coherent optical receiver combines two optical beams, a signal and a local oscillator, together to form an interference. The interference between these optical waves produces a "beat" which allows the measurement of the phase difference between the signal and the local oscillator. This interference produces an amplitude, polarization, and phase sensitive receiver output. In order to consider these effects a discussion of the polarization state of plane waves is in order. A plane wave contains two orthogonal vector components which are also orthogonal to the direction of propagation of the wave. For purposes of discussion we will consider the plane wave to be oriented so that the vector components of the electromagnetic field lie in an X-Y plane and that the wave propagates in the Z direction. However, this choice of axes is completely arbitrary. In practice, the wave can be oriented in any propagation direction. In order to simplify discussions, a simple change of coordinates will make this discussion completely general.

The polarization of an electromagnetic (or optical) plane wave, p, is described by a minimum of five parameters. There are two basic ways of specifying these parameters. The first way leads to a description which is oriented towards that which is directly obtained from physical measurements.

$$\vec{E}_p(E_{px}, E_{py}, \Phi_{px}, \Phi_{py}, \omega_p, t) = \begin{bmatrix} E_{px}(t)\cos(\omega_p t + \Phi_{px}) \\ E_{py}(t)\cos(\omega_p t + \Phi_{py}) \end{bmatrix} \quad (4)$$

The second manner of describing the polarization state of a wave, p, is oriented more towards the underlying physical mechanisms of polarization. See FIG. 1. The description is made in terms of spatial and temporal parameters:

$$\vec{E}_p(E_p, \theta_p, \psi_p, \phi_p, \omega_p, t) = E_p t \begin{bmatrix} \cos(\theta_p) & \sin(\theta_p) \\ -\sin(\theta_p) & \cos(\theta_p) \end{bmatrix} \quad (5)$$
$$\begin{bmatrix} \cos(\psi_p) & 0 \\ 0 & \sin(\psi_p) \end{bmatrix}$$
$$\begin{bmatrix} \cos(\omega_p t + \phi_p) \\ \sin(\omega_p t + \phi_p) \end{bmatrix}$$

Alternatively, dropping the full variable list in the parentheses and expanding:

$$\vec{E}_p(t) = E_p t \begin{bmatrix} \cos(\theta_p) & \sin(\theta_p) \\ -\sin(\theta_p) & \cos(\theta_p) \end{bmatrix} \begin{bmatrix} \cos(\psi_p) & 0 \\ 0 & \sin(\psi_p) \end{bmatrix} \quad (6)$$
$$\begin{bmatrix} \cos(\phi_p) & -\sin(\phi_p) \\ \sin(\phi_p) & \cos(\phi_p) \end{bmatrix} \begin{bmatrix} \cos(\omega_p t) \\ \sin(\omega_p t) \end{bmatrix}$$

If $E_P$ is constant, the electrical power of this wave can be shown to be constant and equal to:

$$P_p(t) = \frac{\langle \vec{E}_p(t) \cdot \vec{E}_p(t) \rangle}{\eta} = \frac{E_p^2}{2\eta} \quad (7)$$

When two waves, S (signal) and L (local oscillator), interfere at the input of a photoreceiver, the output is:

$$v_{out}(t) = AR_L i(t) \quad (8)$$
$$= AR_L \Re \frac{\langle \vec{E}_S(t) \cdot \vec{E}_S(t) + \vec{E}_L(t) \cdot \vec{E}_L(t) + 2\vec{E}_L(t) \cdot \vec{E}_S(t) \rangle}{\eta}$$
$$v_{out}(t) = v_L(t) + v_S(t) + v_{LS}(t)$$
$$= AR_L \Re (P_L(t) + P_S(t) + P_{LS}(t))$$

If the optical power of the local oscillator and signal lightwaves remain constant, a constant photocurrent develops for the self-interference terms ($P_S$ and $P_L$). However, if either the local oscillator or the signal lightwaves have any temporal variation in polarization or phase, the cross interference term ($P_{LS}$) will be time dependent even if the power of each lightwave remains constant. Solving for the cross interference term, we obtain:

$$v_{LS}(t) = \frac{AR_L R}{\eta} E_L(t) E_S(t) \begin{bmatrix} \cos(\Delta\theta)\cos(\Delta\psi)\cos(\Delta\omega t + \Delta\phi) + \\ \sin(\Delta\theta)\sin(2\overline{\psi})\sin(\Delta\omega t + \Delta\phi) \end{bmatrix} \quad (9)$$

$$v_{LS}(t) = 2AR_L R \sqrt{P_L(t) P_S(t)}$$
$$\begin{bmatrix} \cos(\Delta\theta)\cos(\Delta\psi)\cos(\Delta\omega t + \Delta\phi) + \\ \sin(\Delta\theta)\sin(2\overline{\psi})\sin(\Delta\omega t + \Delta\phi) \end{bmatrix}$$

Where the following definitions are made:

$\Delta\theta = \theta_S - \theta_L$ $\Delta\psi = \psi_S - \psi_L$ $2\overline{\psi} = \psi_S + \psi_L$ $\Delta\omega = \omega_S - \omega_L$ $\Delta\phi = \phi_S - \phi_L \quad (10)$ The optical cross-interference portion of the receiver output will fade due to polarization even if the local oscillator and the signal lightwaves both do not have zero optical powers. This condition will occur if:

$O = \cos(\Delta\theta)\cos(\Delta\psi)\cos(\Delta\omega t + \Delta\phi) = \sin(\Delta\theta)\sin(2\overline{\psi})\sin(\Delta\omega t + \Delta\Phi) \quad (11)$ Also, equivalently when the condition will occur:

$$\begin{bmatrix} 0 \\ 0 \end{bmatrix} = \begin{bmatrix} \cos(\Delta\theta)\cos(\Delta\psi)\cos(\Delta\omega t + \Delta\phi) \\ \sin(\Delta\theta)\sin(2\overline{\psi})\sin(\Delta\omega t + \Delta\phi) \end{bmatrix} \quad (12)$$

When heterodyne optical detection is employed ($\Delta\omega$ is non-zero, the local oscillator has a different frequency from the signal), the conditions for a fade are shown in Table 1. When homodyne detection is employed ($\Delta\omega$ is zero), both phase and polarization fading occur. The conditions for a homodyne fade are shown in Table 2. Heterodyne detection is therefore seen to be superior to homodyne because the probability of a fade is fully one half as likely.

TABLE 1

Heterodyne Fading Conditions

| Type of Fade (k is an integer) | Required Simultaneous Conditions for a Fade to Occur | | |
|---|---|---|---|
| Orthogonal Rotation and Opposite Ellipticity | $\Delta\theta = (2k + 1)\pi/2$ | $\psi_S + \psi_L = 0$ | |
| Orthogonal Rotation and Equal Circular Ellipticity | $\Delta\theta = (2k + 1)\pi/2$ | $\psi_S + \psi_L = \pm\pi$ | |
| Equal Rotation and Orthogonal Ellipticity | $\Delta\theta = 0$ | $\Delta\psi = \pm\pi/2$ | |
| Opposite Rotation and Orthogonal Ellipticity | $\Delta\theta = \pm\pi$ | $\Delta\psi = \pm\pi/2$ | |

TABLE 2

Homodyne Fading Conditions

| Type of Fade (k and m are integers) | Required Simultaneous Conditions for a Fade to Occur | | |
|---|---|---|---|
| Orthogonal Rotation and Opposite Ellipticity | $\Delta\theta = (2k + 1)\pi/2$ | $\psi_S + \psi_L = 0$ | |
| Orthogonal Rotation and Equal Circular Ellipticity | $\Delta\theta = (2k + 1)\pi/2$ | $\psi_S + \psi_L = \pm\pi$ | |
| Equal or Opposite Rotation and Orthogonal Ellipticity | $\Delta\theta = k\pi$ | $\Delta\psi = \pm\pi/2$ | |
| Orthogonal Rotational and Equal or Opposite Phase | $\Delta\theta = (2k + 1)\pi/2$ | $\Delta\phi = m\pi$ | |

Given the conditions for and the functional relation of a fade, the question now arises as to how a fade can be prevented. Since the signal is being measured, no a priori knowledge is assumed and therefore $E_S$, $\theta_S$, $\Psi_S$, $\Phi_S$ are all probably unknown quantities. If fading is prevented, then no loss of information occurs and determination of these four parameters is possible. In order to decode the optical receiver output into these parameters, at least four independent measurements must be made to uniquely determine these four independent variables. However, if the interfering optical beam (or beams) of the local oscillator are unknown, then additional independent measurements must be made (four additional measurements for each unknown beam) to determine the $E_L$, $\theta_L$, $\Psi_L$, or $\Phi_L$ for each optical beam of the local oscillator. The cross-reference output of the photoreceiver, $v_{LS}(t)$, offers the only means by which to measure these parameters. If the parameters cannot be determined from this output, then an optical fade cannot be ruled out.

We shall now examine the information which can be gleaned from this output. Define the following functions.

$$v_I(E_L, E_S, \Delta\theta, \Delta\psi) = \frac{AR_L R}{2\eta} E_L(t) E_S(t) \cos(\Delta\theta)\cos(\Delta\psi) \quad (13)$$
$$= AR_L R\sqrt{P_L(t) P_S(t)} \cos(\Delta\theta)\cos(\Delta\psi)$$

$$v_Q(E_L, E_S, \Delta\theta, 2\overline{\psi}) = \frac{AR_L R}{2\eta} E_L(t) E_S(t) \sin(\Delta\theta)\sin(2\overline{\psi})$$
$$= AR_L R\sqrt{P_L(t) P_S(t)} \sin(\Delta\theta)\sin(2\overline{\psi})$$

In the homodyne case ($\Delta\omega$ is zero), we obtain the following output:

$$v_{LS} = 2AR_L R\sqrt{P_L(t) P_S(t)} \begin{pmatrix} \cos(\Delta\theta)\cos(\Delta\psi)\cos(\Delta\phi) + \\ \sin(\Delta\theta)\sin(2\overline{\psi})\sin(\Delta\phi) \end{pmatrix} \quad (14)$$

$v_{LS}(t) = 2v_I(E_L, E_S, \Delta\theta, \Delta\psi)\cos(\Delta\phi) + 2v_Q(E_L, E_S, \Delta\theta, 2\overline{\psi})\sin(\Delta\phi)$ The homodyne output only allows the measurement of one quantity. The output provides only one independent measurement (one equation) whereas a minimum of four are required. In the heterodyne case ($\Delta\omega$ is non-zero), the output is:

$$v_{LS} = 2AR_L R\sqrt{P_L(t) P_S(t)} \begin{pmatrix} \cos(\Delta\theta)\cos(\Delta\psi)\cos(\Delta\omega t + \Delta\phi) + \sin(\Delta\theta)\sin \\ (2\overline{\psi})\sin(\Delta\omega t + \Delta\phi) \end{pmatrix} \quad (15)$$

-continued $$v_{LS}(t) = \frac{2AR_LR}{\eta} E_L(t) E_S(t) \begin{pmatrix} \cos(\Delta\theta)\cos(\Delta\psi)\cos \\ (\Delta\omega t + \Delta\phi) + \sin(\Delta\theta)\sin \\ (2\overline{\psi})\sin(\Delta\omega t + \Delta\phi) \end{pmatrix}$$

$$v_{LS}(t) = 2v_I(E_L, E_S, \Delta\theta, \Delta\psi)\cos(\Delta\omega t + \Delta\phi) + 2v_Q$$

$$(E_L, E_S, \Delta\theta, 2\overline{\psi})\sin(\Delta\omega t + \Delta\phi)$$

Since sine and cosine waves are orthogonal, the heterodyne receiver provides two independent measurements by mixing down to baseband the $\Delta\omega$ radian frequency components. Thus, two outputs are obtained:

$$V_I(t) = \langle v_{LS}(t)\cos(\Delta\omega t)\rangle = v_I(E_L(t), E_S(t), \Delta\theta(t), \Delta\psi(t)) \cos(\Delta\phi(t))$$

$$V_Q(t) = \langle v_{LS}(t)\sin(\Delta\omega t)\rangle = v_Q(E_L(t), E_S(t), \Delta\theta(t), 2\overline{\psi}(t))\sin(\Delta\phi(t)) \quad (16)$$

b. Correlation or Time-Delay Multiplexing

In many optical sensor applications, the lightwave signal heterodyne-detected by the photodetector system is a composite optical signal formed from the superposition of many individual optical signals. When the receiver lightwave is generated by backscatter, the composite optical signal is the superposition of individual light signals generated by a continuum of reflections of an interrogation light source. The temporal and spatial characteristics of each reflector or reflective region creates a modulation of the interrogation light source. The time-delay, amplitude, polarization and phase states control the backscattered-modulation of these individual optical signals arriving at the photodetector with a unique time-delay interval can be separated into channels which sort the optical signals into time-delay slots or bins. Depending upon how the signals are generated, these channels can represent spatial regions in space or time-delay slots of a time-domain reflectometer mechanism.

Let an interrogation lightwave source be generated by modulating the amplitude, phase or polarization of a coherent lightwave with a time-structured correlation code, c(t). The correlation code, c(t) can be a series of pulses, chirps, binary sequences or any other type of code which provides the required correlation characteristics. If the lightwave source is:

$$E_{SS}(t) = E_{SS}\cos(\omega_S t) \quad (17)$$

Then an amplitude modulated interrogation source is:

$$E_i(t) = \mu_A c(t) E_{SS}\cos(\omega_S t) \quad (18)$$

Alternatively, a phase modulated interrogation source is:

$$E_i(t) = E_{SS}\cos(\omega_S t + \mu_P c(t)). \quad (19)$$

If c(t) is chosen to be temporally structured properly, then:

$$R_i(\tau) = \langle E_i(t) E_i(t+\tau)\rangle \approx \begin{cases} \frac{E_{SS}^2}{2}; \tau \approx 0 \\ 0; \text{otherwise} \end{cases} \quad (20)$$

c(t) must be chosen so that an a priori decoding/demultiplexing function, d(t), exists such that:

$$b(t, \tau) = \langle d(t) E_i(t+\tau)\rangle \approx \begin{cases} \xi E_{SS}\cos(\Delta\omega t + \phi); \tau \approx 0 \\ 0; \text{otherwise} \end{cases} \quad (21)$$

For instance, suppose the interrogation wave is:

$$E_i(t) = \mu_A c(t) E_{SS}\cos(\omega_S t) \quad (22)$$

and:

$$R_c(\tau) = \langle c(t) c(t-\tau)\rangle \approx \begin{cases} 1; z \approx 0 \\ 0; \tau \neq 0 \end{cases} \quad (23)$$

then a valid decoding and temporal and spatial domains demultiplexing function is:

$$d(t) = \mu_d C(t) E_L \cos((\Delta\omega + \omega_S)t + \phi) \quad (24)$$

$$b(t, \tau) = \langle d(t-\tau) E_i(t)\rangle$$

$$= \begin{cases} \frac{\mu_d \mu_A E_{SS} E_L}{2}\cos(\Delta\omega(t-\tau) + \phi - \omega_S \tau); \tau \approx 0 \\ 0; \text{otherwise} \end{cases}$$

Therefore, delaying the correlation decoding/demultiplexing function d(t) allows demultiplexing of delay multiplexed signals identifiable by speed of propagation and distance of flyback travel. Suppose an optical wave is formed a summation of delayed signals modulated onto the interrogation wave $E_i(t)$, then the received wave, $E_b(t)$, is:

$$E_b(t) = \sum_{n=1}^{N} A_n(t-\tau_n) \mu_A c(t-\tau_n) E_{SS}\cos\begin{pmatrix} \omega_S(t-\tau_n) + \\ \Phi_n(t-\tau_n) \end{pmatrix} \quad (25)$$

Then multiplying by the decoding/demultiplexing function, $d(t-\tau_m)$, we obtain:

$$d(t) = \mu_d c(t) E_L \cos((\Delta\omega + \omega_S)t + \phi) \quad (26)$$

$$b(t, \tau_m) = \langle d(t-\tau_m) E_b(t)\rangle$$

$$b(t, \tau_m) \approx \frac{\mu_d \mu_A E_{SS} E_L}{2} A_m(t-\tau_m)\cos\begin{pmatrix} \Delta\omega(t-\tau_m) + \phi - \\ \omega_S \tau_m + \Phi_m(t-\tau_m) \end{pmatrix}.$$

Because $\tau_n$ is unique, the amplitude signal $A_m(t-\tau_m)$ and the phase signal $\Phi_m(t-\tau_m)$ are both extracted from $E_b(t)$ by multiplying by the decoding/demultiplexing function, $d(t-\tau_m)$. The technique is applicable to a wide variety of other optical signal multiplexing applications. Specifically, the technique can be used to spatially separate optical signals arriving from a temporally varying time-domain reflectometer optical backscatter process from an array of fiber optic acoustic sensors.

(2) Description and Operation of the Rayleigh Optical Scattering and Encoding (ROSE) System a. ROSE Optical Phase Sensor Interrogation Enables Sensor Subsystem In order to more fully describe the capabilities and new features of the invention, the application of the invention to a subsystem 1, FIG. 2, of ROSE which launches an interrogation signal onto fiber span 9 and retrieves lightwave back propagation from a continuum of locations along the span. Back propagation mechanisms may include Rayleigh Optical Scattering (ROS) and other effects generated within the optical fiber. Rayleigh Optical Scattering (ROS) in an optical fiber backscatters light incident upon the fiber. The incident light transverses down the optical fiber to the scattering point/region. At the scattering region the incident light is backscattered back up the optical fiber. As the light transverses the round trip optical path (i.e., distance of flyback travel) any disturbance of the fiber which increase or decrease the optical path length will cause the phase of the incident and backscattered light to be modulated. Suppose a pressure is applied to the optical fiber. The pressure elongates the path length of the light transversing the region.

Figure 2:
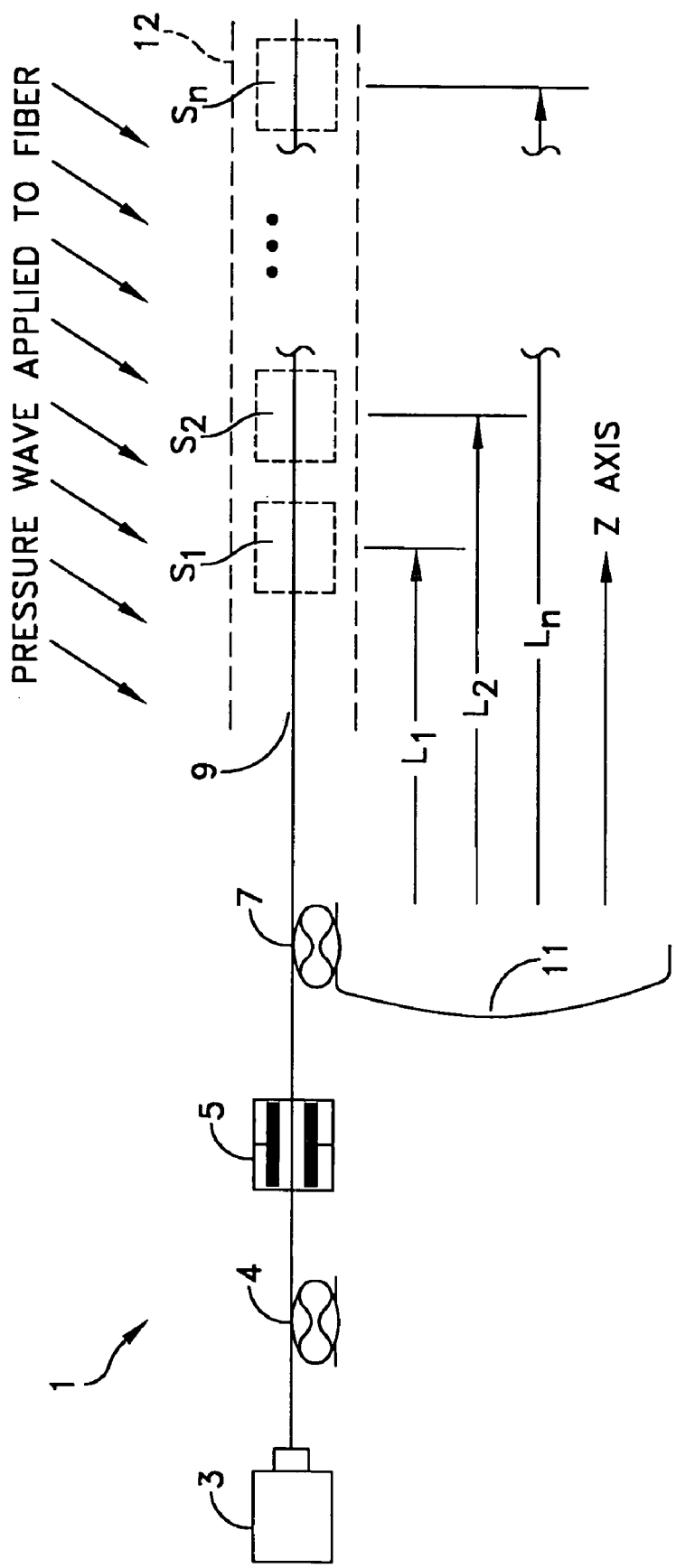
FIG. 2 is a block diagram helpful in understanding the concept of launch of an interrogation signal along an optical fiber span providing a virtual array of pressure wave sensors by retrieval of backscatter from Rayleigh Optical Scatter (ROS) effects.

Refer to FIG. 2. for the following discussion. In the FIGS. like parts correspond to like numbers. Let p(t,z) be pressure applied to the outside of the optical fiber at time, t, and at point or length, z, along the fiber axis. Then if an interrogation optical wave, $E_i(t)$, generated by laser 3, passed through optical coupler 4 and modulated by optical modulator 5 is applied to optical coupler 7, this results in the following output interrogation wave, $E_i(t)$, being transmitted down the fiber 9:

$$E_i(t) = \mu_A c(t) E_{ss} \cos(\omega_s t). \tag{27}$$

The backscattered wave, $E_b(t)$, arriving back at an optical coupler 7 from ROSE fiber optic array 9 passes into optical path 11. The backscattered light which arrives at optical path 11 is the summation of all light backscattered from a continuum of locations along the length of the ROSE fiber optic span 9. As will later herein be described in detail, fiber 9 has a longitudinal strain component enhancing coating 12. If r(z) is the reflection density at point or length z along the fiber and $c_L$ is the optical wave speed, then the backscattered light after a pressure p(t,z) is applied to fiber is represented mathematically as:

$$E_b(t) = \int_0^\infty r(\hat{z}(t, z)) \mu_A c \tag{28}$$
$$\left(t - \frac{2\hat{z}(t, z)}{c_L}\right) E_{ss} \cos\left(\omega_s\left(t - \frac{2\hat{z}(t, z)}{c_L}\right)\right) dz$$

where:

$$\hat{z}(t, z) = z + \mu_L \int_0^z p(t, x) dx. \tag{29}$$

If the distributed reflection, r(z) is essentially independent of the applied pressure, p(t,z) then the backscatter is:

$$E_b(t) = \int_0^\infty r(z) \mu_A c \tag{30}$$
$$\left(t - \frac{2\hat{z}(t, z)}{c_L}\right) E_{ss} \cos\left(\omega_s\left(t - \frac{2\hat{z}(t, z)}{c_L}\right)\right) dz.$$

Since optical path length change caused by the applied pressure, p(t,z) is usually extremely small (on the order of $10^{-6}$ to $10^1$ times an optical wavelength), the backscattered light from each z distance down the fiber arrives at the optical path 11 with a transversal delay, $\tau(t,z)$, equal to:

$$\tau(t, z) \approx \frac{2z}{c_L}. \tag{31}$$

Therefore, to receive the signal $S_1$ backscattered from the fiber region at length-down-the-fiber $z=L_1$, the correlational multiplexing characteristic of the transmitted interrogation light can be utilized. Multiplication of the total backscattered optical signal by the correlation decoding/demultiplexing function, $d(t-\tau(t,z_1))$, produces an output which contains the signal, $S_1$, backscattered from a distance $L_1$ down the fiber and rejects signals originating from other fiber regions, such as $S_2$, $S_n$ and etc. Representing this process mathematically, the resulting channel output, $B(t, L_1)$ is obtained as follows:

$$b(t, \tau_1) = \langle d(t - \tau_1) E_b(t) \rangle = \left\langle d\left(t - \frac{2L_1}{c_L}\right) E_b(t) \right\rangle = B(t, L_1) \tag{32}$$

$$d\left(t - \frac{2L_1}{c_L}\right) = \mu_d c\left(t - \frac{2L_1}{c_L}\right) E_L \cos\left((\Delta\omega + \omega_S)\left(t - \frac{2L_1}{c_L}\right) + \phi\right)$$

$$E_b(t) = \int_0^\infty r(z) \mu_A c\left(t - \frac{2z}{c_L}\right) E_{SS} \cos\left(\omega_S\left(t - \frac{2\hat{z}(t, z)}{c_L}\right)\right) dz$$

$$\Phi(z, L_1) = \phi - \frac{2(\Delta\omega + \omega_S) L_1}{c_L} + \Delta\omega \frac{2z}{c_L}$$

$$B(t, L_1) = \mu_d \mu_A E_L E_{SS} \int_0^\infty r(z) R_c\left(\frac{2(z - L_1)}{c_L}\right) \tag{33}$$
$$\cos\left(\Delta\omega t + \Phi(z, L_1) + \frac{2\mu_L \omega_S}{c_L} \int_0^z p(t, x) dx\right) dz$$

$$\Delta\Phi(t, z) = \Phi(z, L_1) + \frac{2\mu_L \omega_S}{c_L} \cdot \int_0^z p(t, x) dx$$

$$B(t, L_1) = V_E \int_0^\infty r(z) R_c\left(\frac{2(z - L_1)}{c_L}\right) \cos(\Delta\omega t + \Delta\Phi(t, z)) dz$$

$$B(t, L_1) \approx V_E r_{L_1} \cos\left(\Delta\omega t + \Phi_{L_1} + \frac{2\mu_L \omega_S}{c_L} \cdot \int_0^{L_1} p(t, x) dx\right)$$

Because of the correlation properties of the interrogation light, the autocorrelation function $R_c(\tau)$ is very small at all spatial locations except those in the vicinity of $z=L_1$. Therefore, all signals originating anywhere else are rejected. Furthermore, the phase of the channel output at location $L_1$ will be the summation or integration of all pressure changes along the bi-directional transversal path. This unusual phenomenon has been demonstrated with experimental hardware.

Once the correlation process isolates the optical signal originating from a spatial region, the signal must be phase demodulated to extract the pressure information. The signal is I (in phase) and Q (quadrature phase) demodulated is:

$$B_I(t, L_1) = \langle B(t, L_1) \cos(\Delta\omega t) \rangle \tag{34}$$

$$B_I(t, L_1) \approx V_E r_{L_1} \cos\left(\Phi_{L_1} + \frac{2\mu_L \omega_S}{c_L} \cdot \int_0^L p(t, x) dx\right)$$
$$= V_1 \cos(\Phi_1)$$

$$B_Q(t, L_1) = \langle B(t, L_1) \sin(\Delta\omega t) \rangle$$

$$B_Q(t, L_1) \approx -V_E r_{L_1} \sin\left(\Phi_{L_1} + \frac{2\mu_L \omega_S}{c_L} \cdot \int_0^{L_1} p(t, x) dx\right)$$
$$= -V_1 \sin(\Phi_1).$$

Then I & Q, or cosine phase and sine phase outputs are converted into either phase rate or phase outputs with simple analog or digital hardware. The phase, so demodulated, allows the inference of information about the acoustic pressure down the fiber to the measurement point.

Once the I & Q outputs are generated, the temporal phase state of $B(t, L_1)$ can be determined by one of several types of phase demodulation processes. The phase state of the region of $L_1$ spatial delay is therefore:

$$\Phi_1 = \Phi_{L_1} + \frac{2\mu_L \omega_S}{c_L} \cdot \int_0^{L_1} P(t,x)\,dx. \quad (35)$$

Likewise, the plurality (which may be a large number, e.g., 5000) of optical signals arising with spatial delays, such as the propagation time for flyback travel to $L_2$ or $L_n$, can be correlated out of the backscattered signal $E_b(t)$. These are:

$$B(t, L_2) \approx V_E r_{L_2} \cos\left(\Delta\omega t + \Phi_{L_2} + \frac{2\mu_L \omega_S}{c_L} \cdot \int_0^{L_2} p(t,x)\,dx\right) \quad (36)$$

$$B(t, L_n) \approx V_E r_{L_n} \cos\left(\Delta\omega t + \Phi_{L_n} + \frac{2\mu_L \omega_S}{c_L} \cdot \int_0^{L_n} p(t,x)\,dx\right)$$

With corresponding phase signals of:

$$\Phi_2 = \Phi_{L_2} + \frac{2\mu_L \omega_S}{c_L} \cdot \int_0^{L_2} p(t,x)\,dx \quad (37)$$

$$\Phi_n = \Phi_{L_n} + \frac{2\mu_L \omega_S}{c_L} \cdot \int_0^{L_n} p(t,x)\,dx.$$

The phase signals, obtained by phase demodulation of each $B(t,L_m)$, represent a pressure field $p(t,z)$ which is integrated along the length, z, of the fiber. Therefore, rather than directly measure $p(t,z)$ the sensor provides all of the accumulated pressure effects down the fiber to the measurement point, $L_m$ (where m is integer corresponding to the measurement point). In sensor arrays, it is usually desired to detect the pressure over a specific measurement region. If two optical signals $S_j$ and $S_k$ are received from measurement lengths $L_j$ and $L_k$, the corresponding demodulated phases $\Phi_j$ and $\Phi_k$ are:

$$\Phi_j = \Phi_{L_j} + \frac{2\mu_L \omega_S}{c_L} \cdot \int_0^{L_j} p(t,x)\,dx \quad (38)$$

$$\Phi_k = \Phi_{L_k} + \frac{2\mu_L \omega_S}{c_L} \cdot \int_0^{L_k} p(t,x)\,dx.$$

A sensor between the lengths down the fiber of $L_j$ and $L_k$ ($L_k > L_j$) is formed by subtracting the two phases:

$$\Phi_k - \Phi_j = \Delta\Phi_{kj} = \left(\Phi_{L_k} + \frac{2\mu_L \omega_S}{c_L} \cdot \int_0^{L_k} p(t,x)\,dx\right) - \quad (39)$$

$$\left(\Phi_{L_j} + \frac{2\mu_L \omega_S}{c_L} \cdot \int_0^{L_j} p(t,x)\,dx\right)$$

$$\Delta\Phi_{kj} = \Phi_{L_k} - \Phi_{L_j} + \frac{2\mu_L \omega_S}{c_L} \cdot$$

$$= \left(\int_0^{L_k} p(t,x)\,dx - \int_0^{L_j} p(t,x)\,dx\right)$$

$$\Delta\Phi_{kj} = \Phi_{L_k} - \Phi_{L_j} + \frac{2\mu_L \omega_S}{c_L} \cdot \int_0^{L_k} p(t,x)\,dx$$

$$\Delta\Phi_{kj} = \Delta\Phi_{L_k L_j} + \frac{2\mu_L \omega_S}{c_L} \cdot \int_{L_j}^{L_k} p(t,x)\,dx.$$

The resulting sensor is of length $\Delta L = L_k - L_j$ with a center position of $(L_k + L_j)/2$. The differencing of phase signals $\Phi_j$ and $\Phi_k$ into a new phase signal $\Delta\Phi_{kj}$, allows a virtual sensor of arbitrary position and length to be formed. The resulting spatially differential sensor also adds the advantage of minimizing other effects such as lead-in fiber strum or vibration which create unwanted phase signals.

The above phenomena illustrates that when the interrogation light is properly encoded, a ROSE (Rayleigh Optical Scattering and Encoding) sensor system is enabled. The subject invention therefore enables the ROSE concept. The subject invention enables spatial discrimination of the optical backscatter effects in a ROSE sensor. The spatial differencing technique rejects unwanted common mode signals inadvertently introduced in fiber leads down to the sensor region. The invention also applies in a similar manner to more conventional fiber optic acoustic sensor arrays (i.e., those having Bragg reflective grating sensors) or to non-fiber optic remote optical sensors which detect phase.

b. Pointwise Signal Delay Multiplexing

The invention also applies to point-wise non-distributed sensors or artificially generated multiplexing by electronics means. The interrogation lightwave can be intercepted and retransmitted back to the receiver with an artificial, electronically generated delay, as a means of delay/correlation multiplexing many channels.

(3) Description of a Fiber System Implementation

The invention can be realized with bulk optical, fiber optical or integrated optical components. For simplicity, a fiber optic implementation will be presented. However, the fiber optic embodiment is being presented without intent of limitation. The teachings of the invention can be used to implement a reflectometer system in accordance with the present invention using these and other instrumentalities providing a light path that has the innate property of producing back propagation of portions of an interrogation signal at a continuum of locations along the length of the propagation path therethrough.

a. Optical Transmitter and Time-Delay Multiplexing Process.

Figure 3:
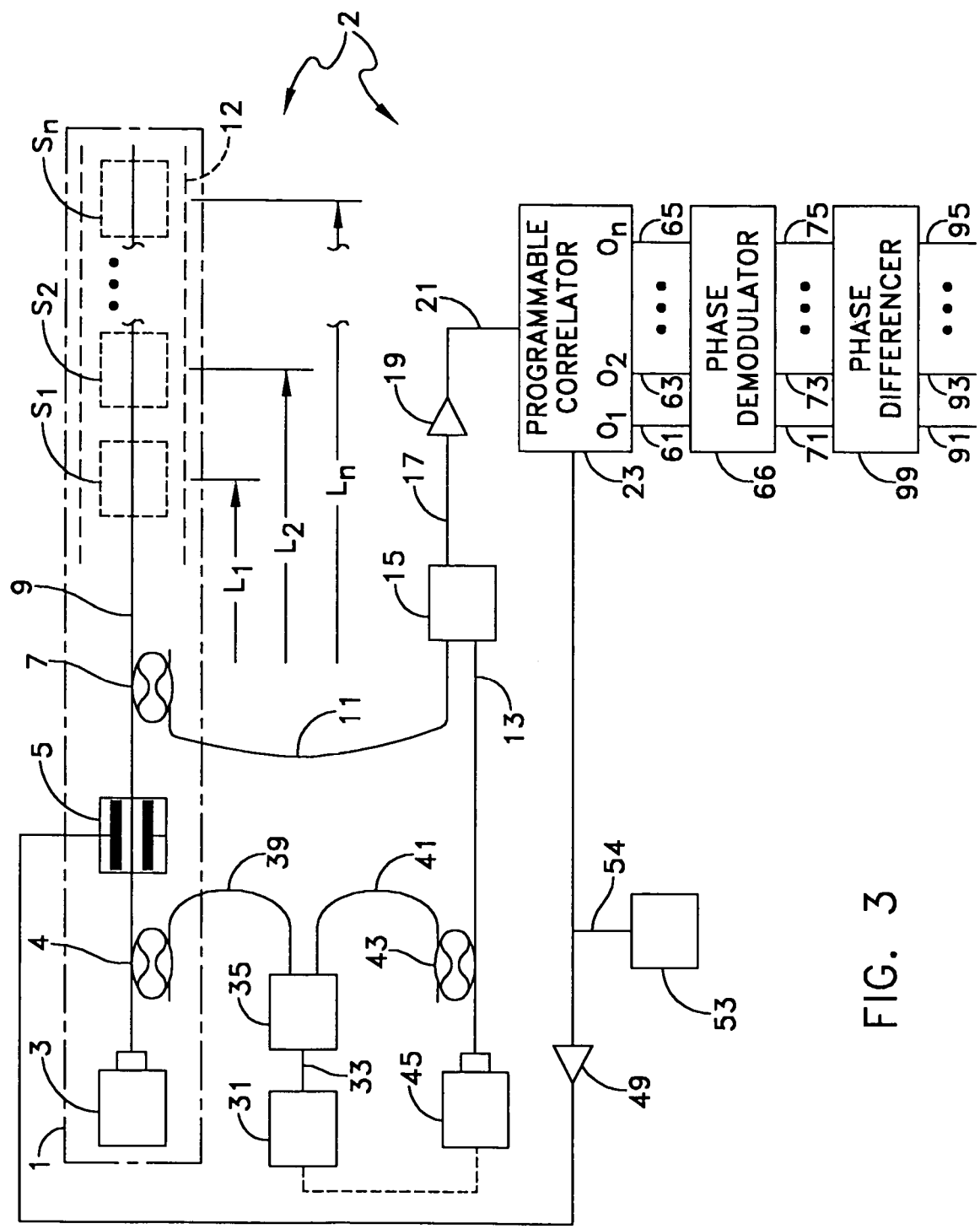
FIG. 3 is a block diagram of a natural fiber span time-domain reflectometer system in accordance with the present invention.

FIG. 3 is an illustrative block diagram implementation of the Rayleigh optical scattering and encoding (ROSE) sensor system 2. Like parts correspond to like numbers. A lightwave from transmitter laser, 3, is propagated through optical coupler or beamsplitter, 4. The smaller portion of the transmitter laser power split off by optical coupler, 4, is passed by optical path, 39, to the phase locking means optical receiver 35. The larger portion of the transmitter laser light power is split by optical coupler, 4, and propagated to optical modulator, 5. The optical modulator, 5, modulates the laser light passing from optical coupler, 4, with correlation code, c(t), as electronically generated in master correlation code generator, 53, and amplified by amplifier, 49. The correlation code, c(t), is modulated onto the laser light in optical modulator, 5. This modulated light comprises the optical interrogation lightwave, $E_i(t)$. The optical modulator, 5, may modulate the amplitude, polarization or phase of the laser light subject to the teachings of the invention. The interrogation lightwave is propagated from optical modulator, 5, to optical coupler, beamsplitter or circulator, 7. The interrogation lightwave passes through the optical coupler, 7, into optical fiber or other light propagation medium, 9. Hereinafter, "down", indicates a transversal on the optical path, 9, away from coupler, 7; "up" indicates a transversal on the optical path 9 toward the optical coupler, beamsplitter or circulator, 7. The interrogation lightwave which transverses down the optical fiber or medium 9 is modulated and is backscattered or returned by other means with equivalent optical path lengths (equivalent to a time delay), $L_1$, $L_2 \ldots L_n$ corresponding to sensors or multiplexed channels $S_1, S_2 \ldots S_n$. The returned interrogation lightwave is a composite optical signal modulated by signals due to the $S_1$ through $S_n$ modulating and time-domain multiplexing actions.

More particularly, the propagation of the optical spread-spectrum interrogation signal down the continuous full span of the optical fiber span, signal launch end to remote end, causes a back-propagating composite optical signal, which is the linear summation, or integration spatially, of all of the individual, continuous, or continuum of back-reflections along the span of the optical fiber.

One component of this composite signal is comprised of the naturally occurring continuum of optical back reflections (including Rayleigh optical scattering ((ROS)) effects) of the optical spread spectrum carrier signal that is formed by modulating the primary-carrier signal by the spectrum spreading signals. Another component is comprised of the artificially occurring optical back reflections, either-point wise reflections or distributed reflections, of the optical spread spectrum carrier signal that is formed due to propagation discontinuities as the result of presence of a fiber cable coupler in span 9. Still another component comprised of the continuum of modulations at locations along the span of the reflected signals due to longitudinal components of optical path length change, causing a delay in the reflected signal, experienced by the fiber optical span along its length.

Such optical path length change or delay may be caused by a variety of possible sources including acoustic pressure waves incident to the fiber, electromagnetic fields coupled to the fiber, mechanical strain or pressure on the fiber, thermal strain or pressure induced in the fiber, or other means of causing change in the optical path length. Use of the acoustic pressure waves mode of changing path length in perimeter intrusion monitoring systems is the principle embodiment illustrated herein. In this use, optical fiber span 9 is employed to provide an array of virtual geophones buried at a range of depths beneath the surface of the ground of about between six (6) inches and one (1) foot, to sense motion of an object on the surface of the ground. The acoustic pressure wave sensing mode is also useful to sense seismic signals, as for example as linear arrays inserted into casing structures of an existing oil wells. Predetermined artificial pressure wave producing shocks are imparted into the ground, and the responses from the sensor are used to locate secondary oil deposits. The acoustic pressure wave sensing mode is further useful for employing span 9 as an array of virtual hydrophones, with the media which couples the signals to the hydrophones at least in part being the body of water in which the array is immersed. Such hydrophone arrays find use as naval undersea warfare towed arrays, or towed geophysical exploration arrays. In the latter the arrays respond to artificially produced shocks of predetermined character and location induced in the body of water, and the response of the array to bottom return signals are used to locate ocean bottom geophysical feature indicating likely presence of an oil deposit. Yet further, a sensing position on a fiber span 9 could be used to receive as an input microphonic signals suitably imparted to the region of the sensing position. The electromagnetic field sensing mode of fiber span 9 could be used for monitoring electronic signals along a telecommunication cable's span to localize malfunctions. Responses of fiber span 9 to mechanical, pressure or thermal strains can be used in systems for monitoring such strains.

The composite lightwave propagates up the optical fiber or medium 9, passes through optical coupler, beamsplitter or circulator, 7, to optical pathway, 11. Optical pathway, 11, passes the backscattered, time-delay multiplexed, composite lightwave, $E_b(t)$, to the optical receiver, 15.

Preferably, fiber 9 is of the relatively low cost, conventional single-mode or multimode, fiber cable types.

Further it is preferable that fiber 9 have extruded thereon a coating 12 of a material which enhances the longitudinal strain which the fiber undergoes from a given radially, or generally laterally, applied pressure wave strain. Materials which provide such enhancement include extrudable thermoplastic polymers (TPU's) or extrudable thermoplastic elastomers (TPE's) which exhibit a combination of a low Young's modules (E) and a low Poisson's ratio ($\sigma$). The Poisson's ration is preferably below 0.5, which is the Poisson's ratio of natural rubber. Examples of such materials include: (i) low density polyethylene, having characteristic $E=1.31$ dynes/cm$^2 \times 10^{-10}$ and $\sigma=0.445$; and (ii) polystyrene, $E=3.78$ dynes/cm$^2$ and $\sigma=0.35$ (values as reported in the paper, R. Hughes and J. Javzynski, "Static Pressure Sensitivity Amplification in Interferometric Fiber-Optic Hydrophones," Applied Optical/Vol. 19/No. 1/1 Jan. 1980).

An alternate embodiment of fiber 9, albeit involving significantly greater cost per unit length of the fiber, is to provide fiber in the more expensive form of a polarization preserving or single polarization, optical fiber. The polarization preserving fiber of this type holds the backscattering light in a narrow range of polarization states so that a substantially single RF signal 21 enters a single set 23 of correlators, reducing the complexity of the system. However, in cases involving long surveillance lines this alternative embodiment becomes expensive in cost of fiber.

The correlation code generator 53 creates a signal, c(t), that has a broad bandwidth. The broadband nature of the correlation code is required to obtain the desired properties in the signals autocorrelation function. The calculation and definition of the autocorrelation function of any general signal is well known and defined in signal processing literature. The correlation code signal, c(t), is so structured that its autocorrelation function is highly peaked at zero delay, and is very small away from zero delay. This criterion is well known to those of skill in the art and is the essence of why the correlation code has a broad bandwidth. Any signal that has the desired autocorrelation function properties can be used as the correlation code in the invention. There are many reasons for choosing one correlation code over another: ease of creation; autocorrelation properties; cost of creation hardware; cost of correlation hardware; and effectiveness in producing spread spectrum signal effects. According to the teaching of the invention, the correlation code for the invention can be a binary sequence with a desired transorthogonal autocorrelation property (sometimes called a pseudonoise sequence), a pseudorandom number (PRN) sequence with the such desired autocorrelation property, chirps, or other types of signals which provide correlations code having predicable non-repetitive behavior. The foregoing list of types of sequence signals which may be employed to modulate the carrier lightwave signal includes both "binary pseudonoise sequences" and "pseudorandom number (PRN) sequences." For purposes of construction of this specification and the appended claims, these terms are employed as they are defined under the listings "Pseudonoise (PN) sequence (communication satellite)" and "Pseudorandom number sequence" at pages 747 and 748 of the "IEEE Standard Dictionary of Electrical and Electronic Terms" (Fourth Edition), which listings are hereby incorporated herein by reference. Further for purposes of construction of this specification and the appended claims, it is deemed that "binary pseudonoise sequence" is generic and "pseudorandom number sequence" is a species thereof. Still further for purposes of construction of this specification and its appended claims, both terms are deemed to include analog signal forms of sequences as well as digital signal forms.

It is to be appreciated that in addition to its correlation encoding function, master correlating code generator 53 is a source of a spectrum-spreading signal comprised of a spectrum-spreading signal which produces an autocorrelation that is well behaved. It has one dominate maxima at zero correlation delay, and its spectrum is large enough to provide sampling of the said optical fiber spatially along the length of the fiber 9 with a resolution commensurate with a sub-length $\Delta Z$ of fiber span 9. These characteristics enable segmentation of an optical fiber 9 of span length L into n segments in accordance with a relationship $$L < \Delta Z \cdot n. \tag{40}$$

In this relationship $\Delta Z$ is a segment length of the fiber span whose length is one-half the distance traveled by light propagating through one zero delay temporal time span of the autocorrelation maxima, $\Delta T$, such that $C_L$ is the speed of light in the said optical fiber and $\Delta T$ is approximately equal to the reciprocal of the spread signal optical bandwidth.

An illustrative embodiment of generator 53 is a shift register type pseudorandom number code generator, having n bits, wherein a code is generated that satisfies said resolution sublength and segment length relationship by choosing an appropriate combination of the number of its bits and the clock time.

The temporal length of the code sequence which is reiteratively produced by generator 53 may be either less than the time period for propagation of a lightwave to the remote end of span and propagation back of a backscattering (i.e. distance of flyback travel), or greater than this time period. It cannot be equal to this period.

The predetermined timing base employed by the source of the spectrum spreading signals, which determines the length of $\Delta Z$ segment is so chosen to provide a positive enhancement to the ratio of the power of back propagating Rayleigh scattering effect $P_R$ to the power of the forward propagated Rayleigh scattering effect $P_T$, in accordance with the following equation:

$$\frac{P_r}{P_t}[dB] = -70 + 10\log_{10}(\Delta L) - \frac{\Delta Z}{100}. \tag{41}$$

b. Laser Phase Locking Means.

Figure 7:
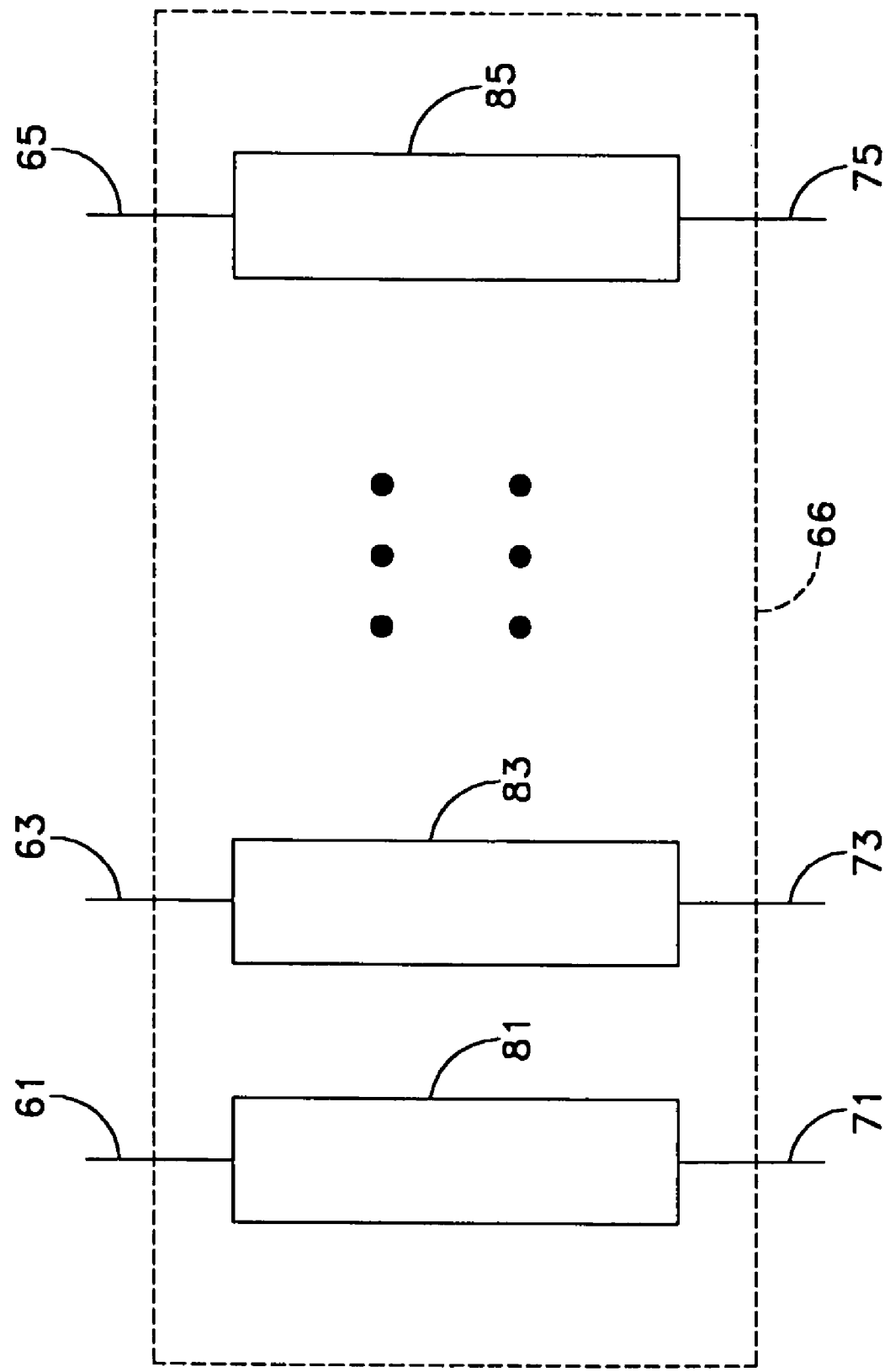
FIG. 7 is a block diagram depiction of a set of phase demodulator circuit assemblies which receives the outputs of the programmable correlator subsystem of FIG. 6.

Refer to FIG. 3. Local oscillator laser, 45, generates a local oscillator lightwave. The local oscillator lightwave propagates from local oscillator laser, 45, to optical coupler or beamsplitter, 43. The optical coupler, 43, splits off the smaller portion of power of the local oscillator lightwave into optical pathway, 41. Optical path, 41, propagates the smaller portion of the local oscillator lightwave to the phase locking means optical receiver, 35. The larger portion of the power of the local oscillator lightwave is split off by optical coupler 43, and passed to optical path 13. Optical pathway, 13, propagates the larger portion of the local oscillator lightwave to optical receiver, 15. The phase locking means optical receiver, 35, receives and interferes the transmitter laser lightwave from optical pathway, 39, and the local oscillator lightwave from optical pathway 41. The receiver 35 interferes the reference lightwaves from lasers 3 and 45 producing an electrical output which is a radio frequency wave on electrical pathway, 33. The electrical output, 33, provides an electronic beat frequency which directly indicates the difference in optical frequency and phase between lasers 1 and 45. Phase locking circuitry 31, employing a conventional phase lock loop mechanism, controls the difference in frequency between laser 1 and 45 and phase locks the two lasers to a fixed frequency and phase relationship as indicated by the dashed line between circuitry 31 and local oscillator laser 45. The radian frequency difference is $\Delta \omega$ as discussed early in the text. The purpose of the laser phase locking means is to insure that the local oscillator lightwave traveling on optical path, 13, into optical receiver, 15, has the proper phase and frequency relationship to the composite lightwave on optical pathway, 11. It is to be appreciated that the phase locking mechanism also acts cooperatively with phase demodulator system 66 to be described later herein. Conventionally, a common master clock oscillator 311, FIG. 7 provides the timing base for both phase locking circuitry 31 and an I & Q demodulator 300, FIG. 7.

Refer to FIG. 3. The composite lightwave on optical path 11, is an input into optical receiver 15. The local oscillator lightwave on optical path, 13, is also an input into optical receiver, 15. The local oscillator and composite lightwaves are interfered on photodetectors producing an electronic signal which electronically represents the heterodyned optical interference power between the two lightwaves. The resulting composite radio frequency signal at output, 17, represents electronically the composite lightwave signal on optical path, 11. The composite electronic receiver signal is passed from optical receiver output, 17, through amplifier, 19, via electronic path, 21, to the correlator system, 23. The local oscillator lightwave on optical path, 13, is interfered with the composite lightwave on optical path 11. The interference power is photodetected in optical receiver, 15, by optically interfering the composite back propagating lightwave on the local oscillator signal. As one of the components of this interfering action, there is produced a difference beat signal which is a composite radio frequency representation of the composite light wave on optical path, 11.

This interfering of the local oscillator output lightwave 13 and the composite back-propagating CW lightwave 11 provides the translation of signal 11 from the optical domain to a CW radio frequency (r.f.) composite difference beat signal 17. This reduces the frequency of signal 15 into an electronically processable signal frequency range. It is to be appreciated that an important aspect of the present invention that the r.f. composite difference signal produce by this translation action includes having counterpart components of the aforesaid components of the composite back-propagating lightwave signal, with the phase states of these counterpart r.f. domain signals the same as the phase states of the corresponding components of the back-propagating lightwave.

In accordance with the present invention, lasers 3 and 45 are to have sufficiently stringent high performance capability with respect to exactness of frequency to enable interference effects therebetween and heterodyne detection of acoustic perturbation signals incident to fiber 9 to produce beat frequencies within the radio frequency (r.f.) range. Also in accordance with the present invention, lasers 3 and 45 have stringent performance criteria with respect to the phase stability, or coherence, of their beams. They are to be substantially coherent over at least a propagation path distance substantially equal to twice the length, L, of sensing fiber 9. For example, a commercially available non-planar, ring laser (e.g. Lightwave Electronics Corp. Model 125) would be suitable for an intruder sensing perimeter intrusion monitoring fiber 9 having a length of 8.0 km (approximately 5 miles). The laser beam of this commercially available laser, which is in the near infrared range, has a frequency of 227 terahertz, or 1319 nanometer wavelength, and has a frequency stability accurately within one part in a billion over 1 millisecond period, or 5 Kilohertz in a 1 millisecond period.

It is to be appreciated that the provision of such frequency and phase stability of lasers 3 and 45 enables implementing the phase locking to produce a sufficiently small non-zero radian phase locking circuitry 31. This in turn enables lasers 3 and 45, under regulation by phase locking circuitry 31, to provide a pair of beams which are phase locked and with a "non-zero $\Delta\omega$" sufficiently small to enable a heterodyne-mode optical receiver to provide the desired beat frequency outputs in the r.f. range. It is understood that laser 45, optical receiver 35, circuitry 31 and beamsplitter 43 could be replaced with an apparatus applying the non-zero $\Delta W$ to the beam from optical pathway 39 to give the same result. The returned interrogation optical composite wave is defined in the preceding subsection 3(a) "Optical Transmitter and Time-delay Multiplexing Process" of this DESCRIPTION OF THE PREFERRED EMBODIMENT.

In the preceding section (1) "Description of Underlying Theories" of this DESCRIPTION OF THE PREFERRED EMBODIMENT there is a definition of "non-zero $\Delta\omega$" and a mathematical demonstration of its importance in the heterodyne mode of interfering. It makes it possible to use relatively simple processes to avoid fading. By way of contrast, fading with the "zero $\Delta\omega$" homodyne mode of interfering would entail much more difficult and less effective fade avoidance processes.

c. Correlation Time-Delay Demultiplexing.

Refer to FIG. 3. The composite radio frequency signal on electrical path, 21, is input into the correlator system, 23. The correlator system delays the master correlation code generator output, 51, an appropriate amount and correlates the delayed correlation code with the composite radio frequency signal. This produces electrical outputs $O_1, O_2 \ldots O_n$ corresponding to signals $S_1, S_2 \ldots S_n$, in turn corresponding to spatial delays $L_1, L_2 \ldots L_n$. The spatial delays $L_1, L_2 \ldots L_n$ are arbitrary and programmable. The electrical output $O_1$ corresponds to $B(t,L_1)$ referred to in the preceding subsection 2(a).

The correlation process is well understood in the literature. The signal that represents the backscattered optical wave in array, 9, that is passed from the optical receiver 15, to the correlator system 23, contains all of the information for all sensors or-channels $S_1, S_2 \ldots S_n$ at once on the electronic signal path 21 entering the correlator 23. Because the backscattered composite signal is modulated with the correlation code by modulator 5, the backscattered light is time structured with the time structure of the correlation code. Because the correlation code is selected to have special autocorrelation code properties, the time structure of the correlation codes allows an electronic representation of the backscattered light at positions $L_1, L_2 \ldots L_n$ to be obtained via the correlation process in the correlator 23. In a preferred embodiment of the invention the master code generator 53 is a shift register type pseudorandom number (PRN) code generator and each correlator of the set 23 would be a correlation type demodulator herein later described in greater depth. Code generator 53 may alternatively be embodied as a binary sequence having transorthogonal autocorrelation properties (binary pseudonoise sequence) and each correlator would then be a correlation-type demodulator for demodulating a binary pseudonoise sequence, whose implementation would be understood by those of skill in the art. The correlator uses the reference correlation code from correlation code generator, 53, which is passed via electronic path 51 to the correlator, 23, as a "golden ruler" enabling sorting out by temporal and spatial domain demultiplexing electronic representations of the backscattering optical signals at sensors or channels $S_1$, $S_2 \ldots S_n$. Various delayed versions of the correlation code are multiplied by the composite signal with all of the sensor or channel signals present simultaneously, from electronic path 21 so that the electronic representations of the sensors or channels $S_1, S_2 \ldots S_n$ are output from the correlator, 23 on signals $O_1, O_2 \ldots O_n$ with respect to the index.

Correlator system 23 is an electronic spread spectrum signal de-spreader and temporal and spatial domain de-multiplexer of the r.f. signal counterpart to the optical composite signal. Its input is coupled to the amplified output 21 of the heterodyner and photodetector, and it is operative in cooperation with said source of spectrum spreading signals to perform a coherent signal correlation process upon the r.f. counterparts of the aforesaid "one" and the aforesaid "still another" components of the composite back-propagating CW lightwave. This causes the de-spreading of the r.f. counterpart of the optical reflected spread spectrum signal and causes the temporal and spatial demultiplexing of the r.f. counterpart of the "still another" component of the composite r.f. signal. This processing provides signals which temporally and spatially sort the said "still another" component into n virtual sensor signal channels, or stated another way n of each of the $\Delta Z$ length measurement regions, measuring the induced optical path change at each of the n $\Delta Z$-length segments of the optical fiber span 9.

It will be appreciated that this sorting process is accomplished by the autocorrelation properties of the spectrum-spreading signal and by the time of flight of the optical spectrum-spreading signal down to each nth reflection segment and back to the heterodyne optical receiver 15. A delayed replica of the spectrum-spreading signal is correlated against the r.f. signal counterpart of the optical composite back-propagating signal, thereby segmenting the optical fiber into n independent segments, or virtual sensors, via the time of flight of the optical composite back-propagating signal and the autocorrelation function of the transmitted spectrum-spreading signal.

It is to be appreciated that system 2 is operating in the spread spectrum transmission and reception mode. Namely, by providing optical interrogation light wave, $E_1(t)$, with modulation by the correlation code, c(t), the continuous wave carrier signal is temporally structured into a spread spectrum interrogation lightwave which continuously reiterates autocorrelatable code sequences. Then after correlation system provides an appropriate time of delay the correlator system 26 correlates the backscattered light wave $E_b(t)$ with the same output, c(t), of code generator 53, de-spreading the spread spectrum signal.

In accordance with well known communication electronics theory this has the effect of increasing signal output of the ROSE sensor system while the noise bandwidth remains the same. In temporally and spatially sorting the r.f. counterpart of the aforesaid "still another" component of the composite back-propagation lightwave, the aforesaid "another" component of undesired noises, such as reflections from couplers in fiber span 9, are materially attenuated.

More particulary, in accordance with this well known theory, the signal-to-noise ratio (SNR) is enhanced by considerable attenuation of noise mechanisms in frequency ranges outside of center frequency lobe of the autocorrelation function and outside the pair of first side lobes to one and the other side of the center frequency lobe.

An illustrative embodiment of electronic spread spectrum signal de-spreader and spatial de-multiplexer for cooperation with the previously described shift register type PRN code generator may comprise a series of n like-shift register code generators respectively receiving the spectrum spreading signal through a corresponding series of n feed channels which cause delays which incrementally increase by an amount of time bearing a predetermined relationship to the fiber span length, and $C_L$, the speed of light through the fiber. The composite r.f. signal is fed to a corresponding series of n multipliers connected to receive as the other multiplier the codes generated by the respective de-spreader and demultiplexer to thereby provide the de-spread and de-multiplexed signal.

d. Heterodyne Phase Demodulation.

Refer to FIG. 3. After the composite radio frequency signal on electrical path 21 is correlation time-delay demultiplexed by the correlator system, 23, the plurality (which upwardly may include a very large number, for instance 5,000) of outputs $O_1, O_2 \ldots O_n$, on the plurality of electrical paths 61, 63 and 65 respectively are phase demodulated by a plurality of individual phase demodulations in the phase demodulator system, 66. The outputs of the phase demodulator system, 66, are the corresponding plurality of electrical paths 71, 73, and 75. The phase demodulator outputs 71, 73, and 75 correspond to the correlator outputs $(O_1, O_2 \ldots O_n)$ 61, 63 and 65 respectively, and to the corresponding plurality of corresponding signals $S_1, S_2 \ldots S_n$ respectively corresponding to spatial delays $L_1, L_2 \ldots L_n$ respectively. The outputs 71, 73, and 75 electronically indicate (with tens of kilohertz potential bandwidth) the phase states of optical signals $S_1, S_2 \ldots S_n$. In particular, output 71 is proportional to the temporal phase $\Phi_1$ of $B(t, L_1)$ hereinbefore discussed in subsections 1(b) "Correlation or Time-delay multiplexing" and 3(c) "Correlation Time-Delay Demultiplexing" of this DESCRIPTION OF THE PREFERRED EMBODIMENT. The phase demodulator outputs 73 and 75 indicate the temporal phase states $\Phi_2$ and $\Phi_n$ of $B(t,L_2)$ and $B(t,L_n)$ respectively.

e. Fading Free Polarization Processing

Preferably system 2 further includes polarization signal characteristic processing functions (not shown), which are used together with the previously described feature that the heterodyning function provides in reducing fading, of the backscattering signal, $E_b(t)$. These polarization processing functions are disclosed in the commonly assigned U.S. Pat. No. 6,043,921 entitled "Fading-Free Optical Phase Rate Receiver," hereby incorporated herein in its entirely. The optical heterodyning feature which provides benefit in reducing fading includes: (i) cooperation of phase locked lasers 3 and 45 in the formation of the optical interrogation light wave, $E_1(t)$, applied to optical fiber 9, or other linearly extended light propagation medium producing Rayleigh effects backscattering, and (ii) the manipulation of this by optical receiver 15 to provide the composite electronic receive signal as optical receiver output 17. This takes advantage of the feature of more favorable Heterodyne fading conditions in a way, in which polarization and phase state signal fading is materially reduced in the detected backscattered light wave $E_b(t)$. The electronic decoding module 700 of U.S. Pat. No. 6,043,921 is substantially equivalent to the correlator system herein. However, the system disclosed in U.S. Pat. No. 6,043,921 for implementing polarization fading reduction (if not substantially eliminating fading) is a generalized stand alone system for processing any optical phase signal having temporally varying polarization, phase, and phase frequency. It must be adapted for application to system 2 by appropriate integration into system 2 included the two following alternative approaches.

One approach for such adaptation passes the fade-free optical phase rate (FFOPR) photoreceiver RF signal to the correlator 23, performs the correlation on the RF signal and completes the Phase Demodulation by In phase and Quadrature phase (hereinafter I & Q) demodulating the correlated RF signal into outputs. This method creates low bandwidth I & Q components and therefore requires low bandwidth analog-to-digital converters (implying a requirement for a large number of analog RF correlation electronic components). This RF correlator approach requires two correlator circuits for every virtual sensor element, or spatial channel, along fiber 9. One correlator is needed for the vertical polarization RF signal path and one correlator is needed for the horizontal polarization RF signal path.

Another approach applies the I & Q demodulator of FIG. 7 of the U.S. Pat. No. 6,043,921 prior to correlation. This approach therefore correlates a wideband set of four I & Q signals. One I, Q, set is for horizontal polarization and the other I, Q, set is for the vertical polarization. In this case the I & Q signals are the I & Q signals for the whole virtual array rather than for one virtual sensor element of the array. Four correlators are required for each sensor element. One correlator is applied to each of the four wide bandwidth I & Q signals for each virtual sensor element. This second approach requires very wideband analog-to-digital converters, but allows digital correlators to be used instead of analog RF correlators. The RF correlator or first approach requires far more analog to digital converters and RF electronics. The digital correlator approach enables the correlators to be implemented by the digital approaches of massively integrated logic circuits and/or programmed processors, requiring far more digital logic, but substantially reducing the r.f. electronics and number analog-to-digital converter units in the system.

f. Phase Differencing

Refer to FIG. 3. The plurality (which upwardly may include a very large number, for instance 5,000) of signals indicating the phase states $\Phi_1, \Phi_2 \ldots \Phi_n$ on electrical paths 71, 73 and 75, respectively, are input into the phase differencer, 99. The phase differencer forms a corresponding plurality of outputs 91, 93 and 95 which are arbitrarily and programmably assigned as the subtractions of any two pairs of phase signals $\Phi_j$ and $\Phi_k$ (where j and k are selected from 1, 2 . . . n).

Each of the programmably selectable pairs of differenced phase signals form a signal $\Delta\Phi_{kj}$ which is spatially bounded within the region of the fiber between lengths $L_j$ and $L_k$. The phase differencer therefore produces differential phase outputs corresponding to a set of programmable length and position virtual sensors.

Stated another way, each programmable selection of pairs of phase signals forms a virtual spatial differential sensor which senses the difference between the phases of the $\Delta\omega$ output of the photodector sub-system (which is the subject of the next subsections) in receiver 15. Each $\Delta\omega$ is an r.f. difference beat signal representative of the aforesaid "still another" component of the composite back-propagating CW lightwave signal which passes from the launch end of fiber span 9 to directional coupler 7. These signals from each pair therefore represent signals of virtual spatial differential sensors along fiber span 9. As a result of the choice of pairs being selectively programmable these virtual sensor can be employed to implement adaptive apertures in processing signal incident the fiber span. This feature would be useful, for example, in enabling security system operators to classify objects causing acoustic pressure wave signals incident up a fiber span 9 used as a perimeter intrusion monitoring line.

g. Optical Detector Sub-System.

Figure 4:
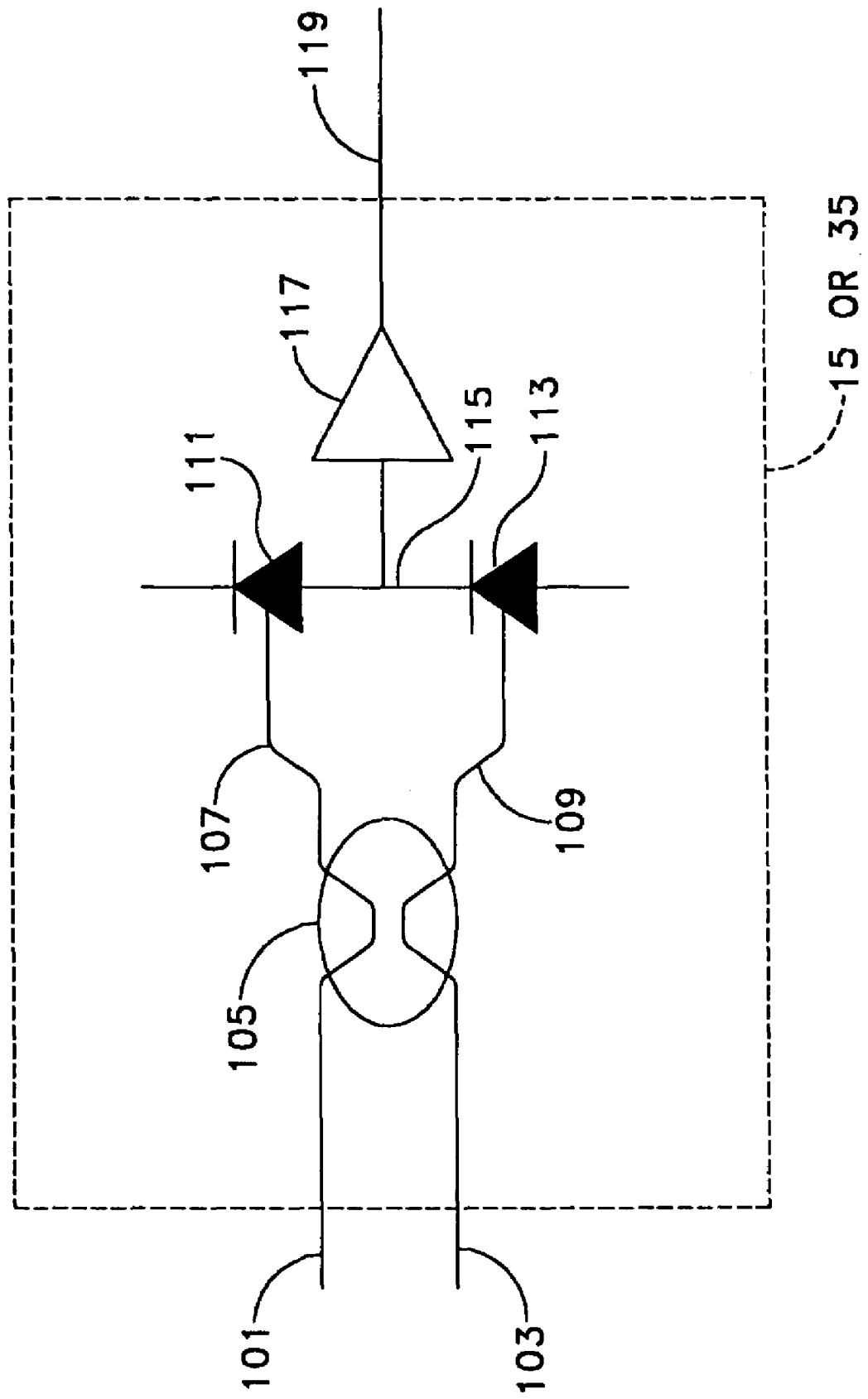
FIG. 4 is an electrical schematic of a balanced heterodyne optic detector circuit.
Figure 5:
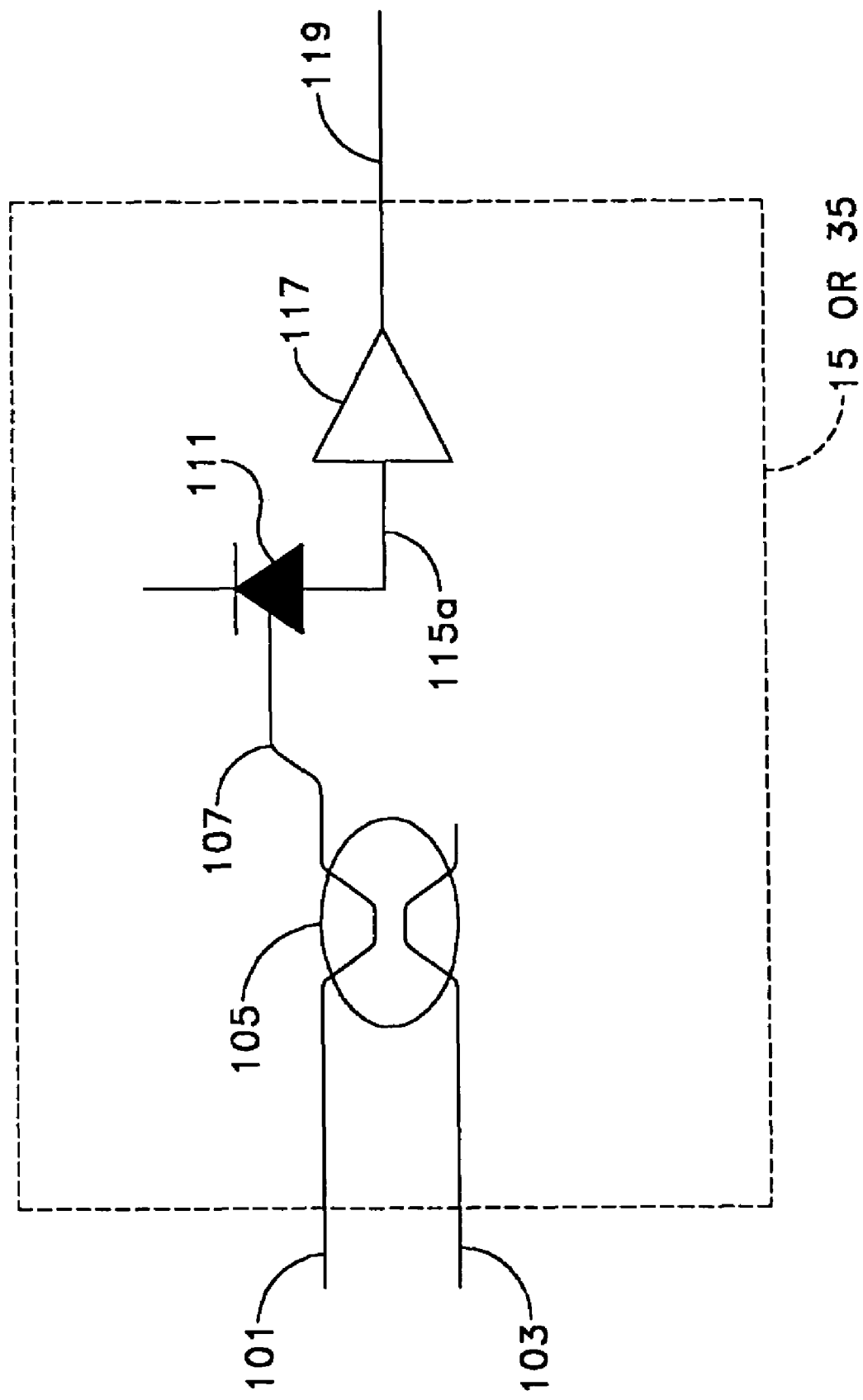
FIG. 5 is an electrical schematic of an alternative embodiment of a photodetector type heterodyner.

The optical receivers 15 and 35, FIGS. 3, 4 and 5, are comprised of photodetector sub-systems. Any of the many well known photodetecting techniques and devices may be employed. Possible implementation of the photodetection sub-systems will now be discussed.

Refer to FIG. 4. Like parts correspond to like numbers. Optical signals enter the photodetector sub-system via optical paths 101 and 103 which are extensions of the paths 11 and 13 in the case of receiver 15, and (not shown) of paths 39 and 44 in the case of subsystem 35. The optical signals are equally split by optical coupler or beamsplitter, 105. The optical signal on path 107 is composite signal comprised of half the optical power of path 101 and half of the optical power arriving on pate 103. The optical signal on path 107 is illuminated on optical detector 111. The photo-current of optical detector 111 flows into electrical conductor 115. Likewise, the optical signal on path 109 is comprised of half the optical power on path 101 and half of the optical power on path 103. The optical signal on path 109 is illuminated on optical detector 113. The photo-current of optical detector 113 flows out of electrical conductor 115. Therefore the photo-currents of optical detectors 111 and 113 are subtracted at electrical conductor or node 115.

Photo-detectors 111 and 113 are precisely matched in responsivity. The differential photocurrent on electrical conductor 115 is input into pre-amplifier 117, amplifier and is passed to electrical output 119. The differential nature of the photo-detection rejects either of the self-optical interference power of the signals on paths 101 and 103 and receives only the cross-interference power between the two optical signals on paths 101 and 103. This particular optical detector architecture is called a balanced heterodyne optical detection scheme. The scheme is 3 dB more sensitive than all other heterodyne optical detection methods and offers the distinct advantage of rejecting local oscillator noise.

Refer to FIG. 5. FIG. 5 illustrates an alternative photo-detection scheme to FIG. 4. Lightwaves enter the receiver at paths 101 and 103. The optical coupler or beamsplitter 105 combines the lightwaves on paths 101 and 103 into a composite lightwave on path 107. The composite lightwave on path 107 illuminates optical detector 111. The photo-current of optical detector caused by the self-interference and cross interference of lightwaves originating from optical paths 101 and 103 passes through conductor 115a, is amplified by pre-amplifier 117 and is passed to electrical output 119.

The optical detector sub-system of FIGS. 4 and 5 correspond to optical receivers 15 or 35 of FIG. 3. Paths 101 and 103 correspond to 11 and 13 and output 119 corresponds outputs 17 in optical receiver 15. Paths 101 and 103 correspond to 39 and 41 and output 119 corresponds to output 33 in optical receiver 35. Either of the photo-detection schemes of FIGS. 4 or 5 can be used for the optical receivers 15 or 35. However, the photodetection scheme of FIG. 4 is preferred.

h. Programmable Correlator System

Figure 6:
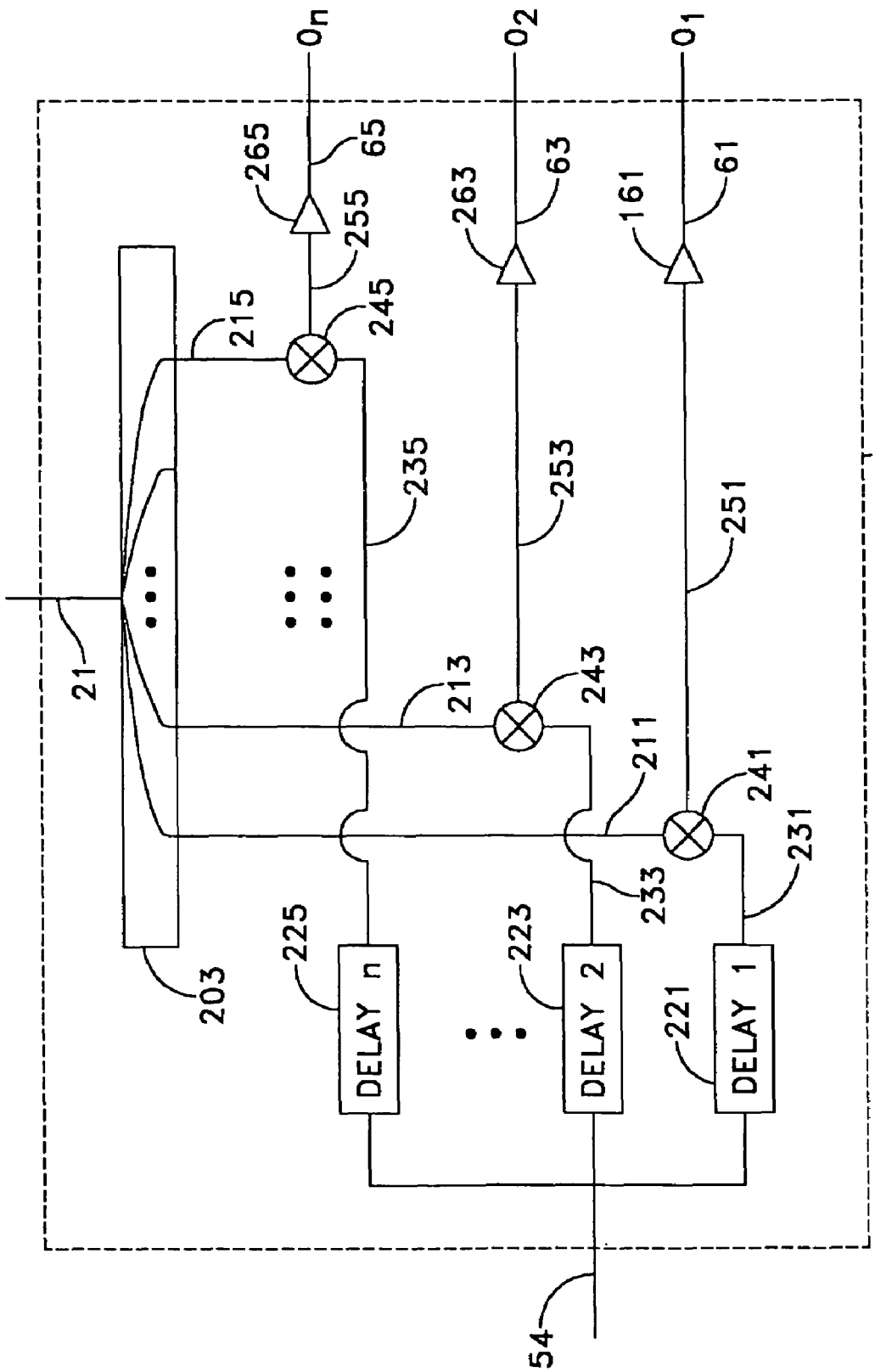
FIG. 6 is a block diagram of a programmable correlator subsystem, which enables spatial sampling of optical signals on the fiber optic span of the system of FIG. 3, in order to provide a virtual array of acoustic wave sensors therealong.

Refer to FIG. 6. The composite radio frequency signal, or r.f. composite reference beat signal, which electronically represents the received time-delay multiplexed optical signal, or composite back-propagation CW lightwave, $E_b(t)$, is input into the correlator system, 23, at electrical input 21. The composite radio frequency signal is n-way split with power splitter 203 into a plurality (which upwardly may include a very large number, for instance 5,000) of electronic pathways including 211, 213 and 215. the master correlation code, c(t), is input into the correlator system, 23, at electrical input 54. The correlation code is distributed to such a plurality of programmable delay circuits including 221, 223 and 225. Each programmable delay circuit delays the master correlation code by the delay required to decode/demultiplex each time-delay multiplexed channel. The plurality of programmable delay circuits including 221, 223 and 225 output a plurality of delayed correlation codes including those on electrical pathways 231, 233, and 225 respectively. The corresponding plurality of delayed correlation codes including those on electrical pathways 231, 233 and 235 are multiplied by a corresponding plurality of multipliers (or balanced mixers) including 241, 243 and 245, respectively, by the radio frequency signal on the plurality of electronic pathways including 211, 213 and 215 which are amplified by a corresponding plurality of amplifiers including 261, 263 and 265, respectively, to produce the corresponding plurality of outputs including $O_1$, $O_2$, and $O_n$ (on lines 61, 63 and 65) respectively. Each of the outputs therefore produces the corresponding demultiplexed signal which is time-gated by the corresponding time-delay of the correlation code. The correlator system 23 of FIG. 6 is an example implementation of the correlation system, 23, of FIG. 3.

The output $O_1$ corresponds to signal $B(t, L_1)$ which is hereinbefore discussed in subsections 2(a) "ROSE Optical Phase Sensor Interrogation Enables Sensor System" and 3(c) "Correlation Time-Delay Demultiplexing" of this DESCRIPTION OF THE PREFERRED EMBODIMENT. The output $O_1, O_2 \ldots O_n$ on lines 61, 63 and 65, respectively, correspond to signals $S_1, S_2 \ldots S_n$ which in turn are based upon the spatial delay associated with distance $L_1, L_2 \ldots L_n$ indicated in FIG. 3. These spatial delays are based on the time of propagation for flyback travel along these distances, which are arbitrary and programmable. The time delay multiplexing of the optical signals comprising the composite back-propagating optical signal on path 11, FIG. 3, arise from a plurality (which upwardly may include a very large number, for instance 5,000) of spatial locations causing a like plurality of time-delays. The correlator system spatially separates the components of the r.f. composite difference beat signal into channels which each uniquely represent an optical signal at a single spatial location.

The correlator system allows the spatial sampling of the optical signals so that a virtual array can be formed along the fiber span 9 on FIG. 3.

i. Phase Demodulation System

The embodiment of phase demodulator system, 66, of FIG. 3, has two uses in system 2. It either: (i) receives the outputs of the just described r.f. correlator subsection 23, or (ii) is part of the integration of the polarization fading reduction system of U.S. Pat. No. 6,043,921 (as discussed in the preceding subsection 2(e) "Fading-Free Polarization Processing" of this DESCRIPTION OF THE PREFERRED EMBODIMENT. Refer to FIG. 7. The phase demodulation system, 66, is comprised of a plurality (which upwardly may include a very large number, for instance 5,000) of phase demodulators, 81, 83 and 85. The inputs to the plurality of phase demodulators, 61, 63 and 65 (the correlator outputs $O_1, O_2 \ldots O_n$ discussed previously) are phase demodulated with phase demodulators 81, 83 and 85 respectively. The outputs of these demodulators are passed on electrical pathways 71, 73 and 75 respectively.

Figure 8:
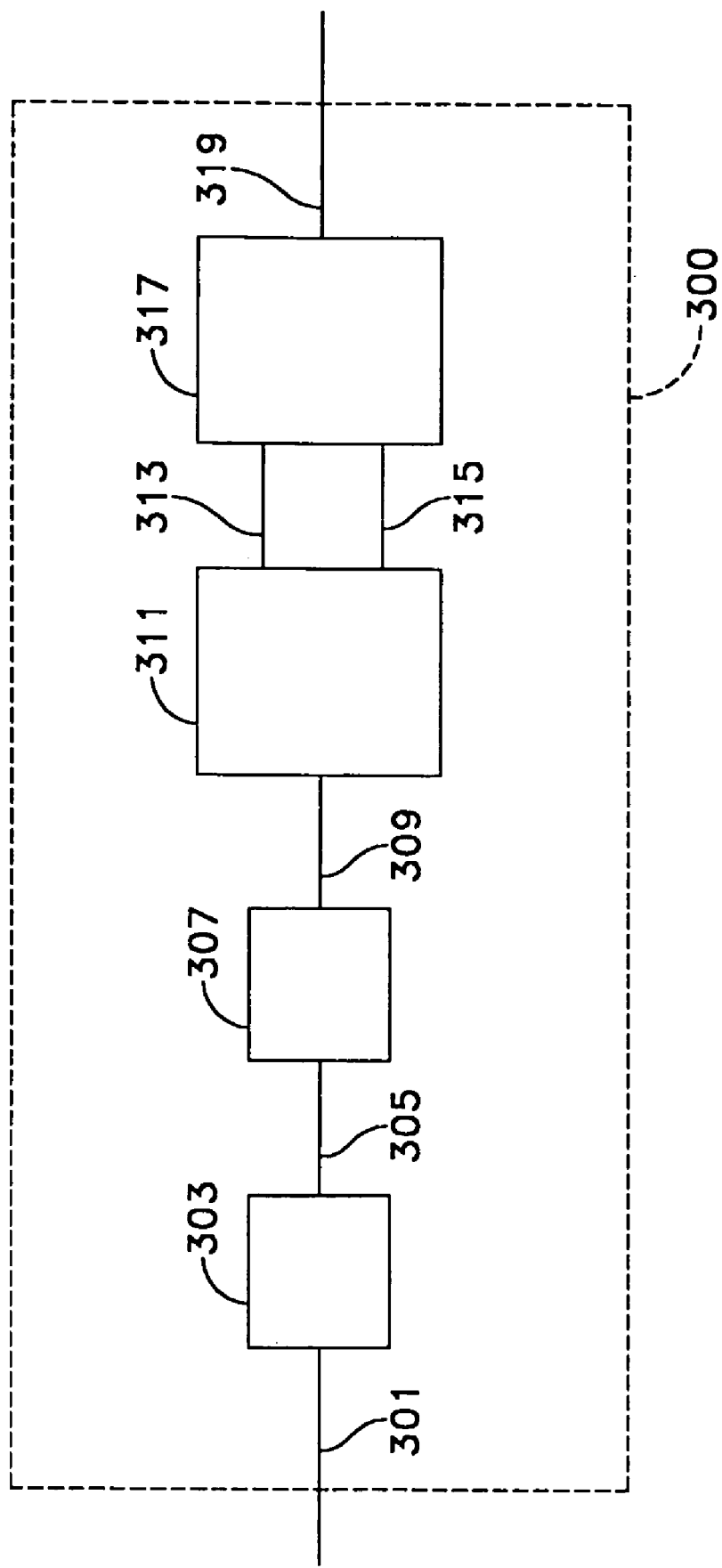
FIG. 8 is a block diagram of one of the phase demodulator circuit assemblies of the set of FIG. 7.

Refer to FIG. 8. An example block diagram of any one of the just discussed phase demodulators 81, 83 and 85 is shown as part 300. The input electrical path 301 corresponds to any one of electrical path 61, 63, 65, etc. of the plurality of phase demodulators. The output electrical path 319 corresponds to any one of electrical path 71, 73, 75, etc. of the plurality of phase demodulators. A correlation system output such as $O_1$, $O_2$ or $O_n$ is passed via electrical path 301 into a bandpass filter 303. The bandpass filter 303 passes only a band of radian frequencies in the vicinity of $\Delta\omega$ so that only $B(t,L_m)$ passes through the filter (where m is an integer corresponding to the particular channel). The band passed signal passes from 303 via electrical path 305 to amplitude control 307. Amplitude control 307 is either an analog automatic gain control circuit, an electronic clipper circuit, or a combination thereof. The amplitude control 307 removes amplitude variations due to polarization fading or other types of signal fading. Because the signal, $B(t,L_m)$ is a result of a heterodyne interference, the phase remains the same after clipping. It is to be appreciated that other phase demodulation schemes for fiber optic signals use a phase carrier technique which does not allow the clipping operation. Clipping is a preferred amplitude control mechanism. The amplitude control 307 passes an amplitude stabilized signal via electrical path 309 to I & Q demodulator 311. The I & Q demodulator removes the carrier, that is it shifts the center radian frequency of the amplitude stabilized $B(t,L_m)$ from $\Delta\omega$ down to zero. The I & Q demodulator outputs a voltage proportional to $\cos(\Phi_m)$ on electrical path 313 and a voltage proportional to $\sin(\Phi_m)$ on electrical path 315. The $\cos(\Phi_m)$ and $\sin(\Phi_m)$ proportional voltages on electrical paths 313 and 315 respectively are converted in an output signal proportional to $\Phi_m$ on electrical path 319 by the phase detector 317.

Reviewing the previous discussion, the plurality of phase demodulators 81, 83 and 85 of FIG. 7 each function like the block diagram of 300 on FIG. 8. The plurality (which upwardly may include a very large number, for instance 5000) of phase demodulators 300 convert to a like plurality of signals $B(t,L_1)$, $B(t,L_2)$ ... $B(t,L_n)$ into a like plurality of signals proportional to $\Phi_1$, $\Phi_2$ ... $\Phi_n$ which correspond to optical signals $S_1$, $S_2$ ... $S_n$.

j. I & Q Demodulator.

Figure 9:
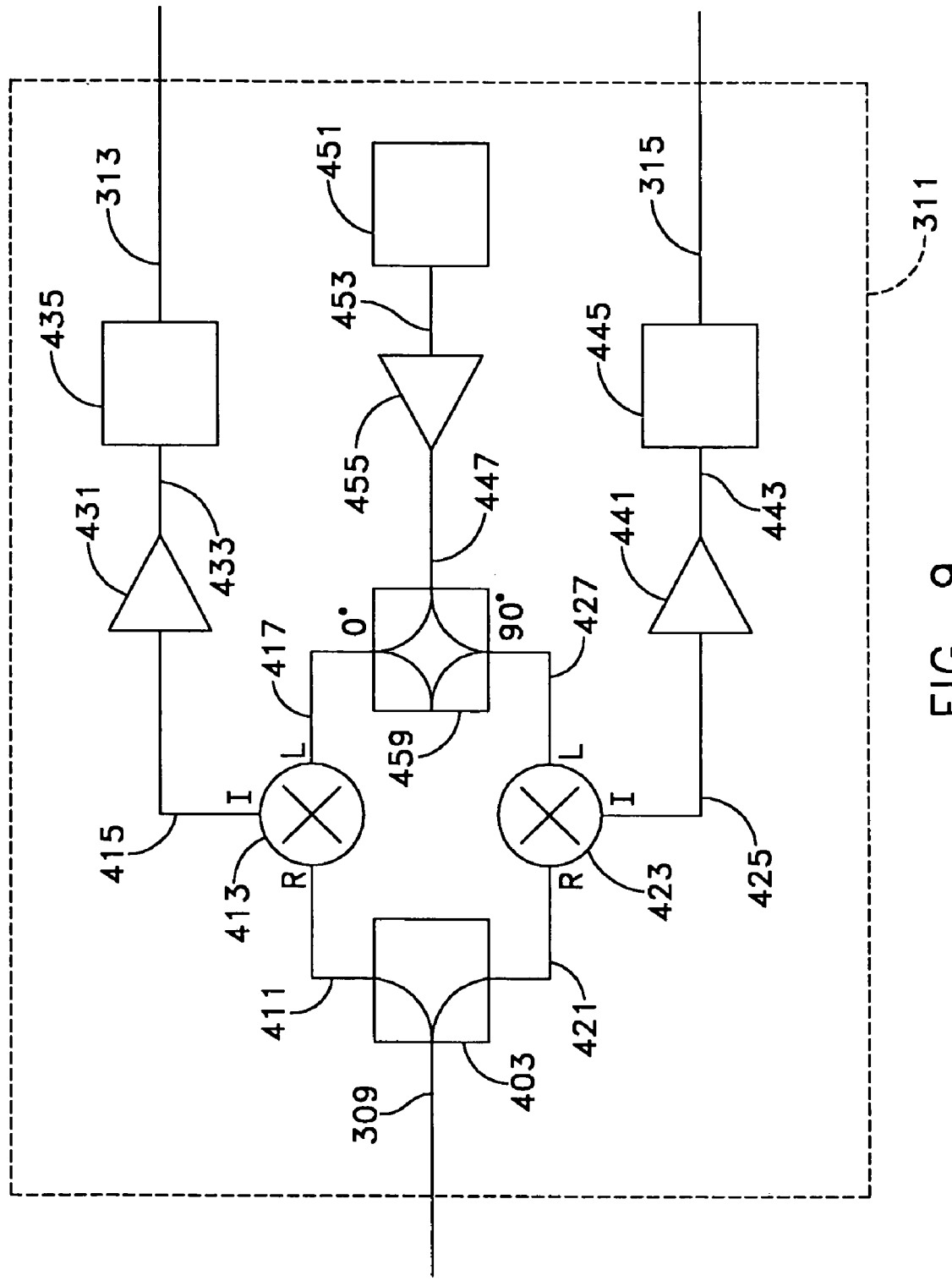
FIG. 9 is a block diagram disclosing details of an I & Q demodulator component in a phase demodulator circuit assembly of FIG. 8.

An example implementation of the I & Q demodulator 311 of FIG. 8 will now be presented. Refer to FIG. 9. An amplitude stabilized $B(t,L_m)$ signal (originating from the amplitude control 307 of FIG. 8) is passed on electrical path 309 to a power splitter 403. Half of the signal power exiting from power splitter 403 is passed to analog mixer, balanced mixer, Gilbert cell or analog multiplier 413 via electrical path 411. The other half of signal power exiting form power splitter 403 is passed to analog mixer, balanced mixer, Gilbert cell or analog multiplier 423 via electrical path 421.

The reference oscillator 451 generates an electronic wave proportional to $\cos(\Delta\omega t)$. As noted earlier herein, this reference oscillator is also the oscillator employed in the conventional phase lock mechanism establishing the fixed phase relationship between the frequencies of primary laser 3 and local oscillator laser 45 whose differences in frequency, $\Delta W$, are of a very low order. In accordance with known principles of heterodyning lightwaves having fixed phase relationships, heterodyning these signals can produce a difference beat signal small enough to be in the r.f. signal range, but with the frequency difference sufficiently high to provide the heterodyning with a band pass allowing transforming a given binary code rate into corresponding code components of the beat signal, such as the code rate of the PRN code sequence produced by PRN code generator 53. This reference oscillator wave is passed from the reference oscillator 451 via the electrical path 453 to amplifier 455. The wave is amplified by amplifier 455 and passed to hybrid coupler 459 via electrical path 447. The hybrid coupler splits the amplified reference oscillator electronic wave into two components one proportional to $\cos(\Delta\omega t)$ on electrical path 417 (providing the "I", or In-phase reference); and one proportional to $\sin(\Delta\omega t)$ on electrical path 427 (providing the "Q", or Quadrature-phase reference).

The In-phase reference on electrical path 417 is multiplied (or frequency mixed) with the signal on electrical path 411 by multiplier 413 to produce the output on electrical path 415. The signal on electrical path 415 is amplified by amplifier 431 and passed to electronic lowpass filter 435 via electrical path 433. The lowpass filter 435 removes high frequency components of the multiplication or frequency mixing process and results in an output at electrical path 313 which is proportional to $\cos(\Phi_m)$.

The Quadrature-phase reference on electrical path 427 is multiplied (or frequency mixed) with the signal on electrical path 421 by multiplier 423 to produce the output on electrical path 425. The signal on electrical path 425 is amplified by amplifier 441 and passed to electronic lowpass filter 445 via electrical path 443. The lowpass filter 445 removes high frequency components of the multiplication or frequency mixing process and results in an output at electrical path 315 which is proportional to $\sin(\Phi_m)$.

k. Phase Detector

Figure 10:
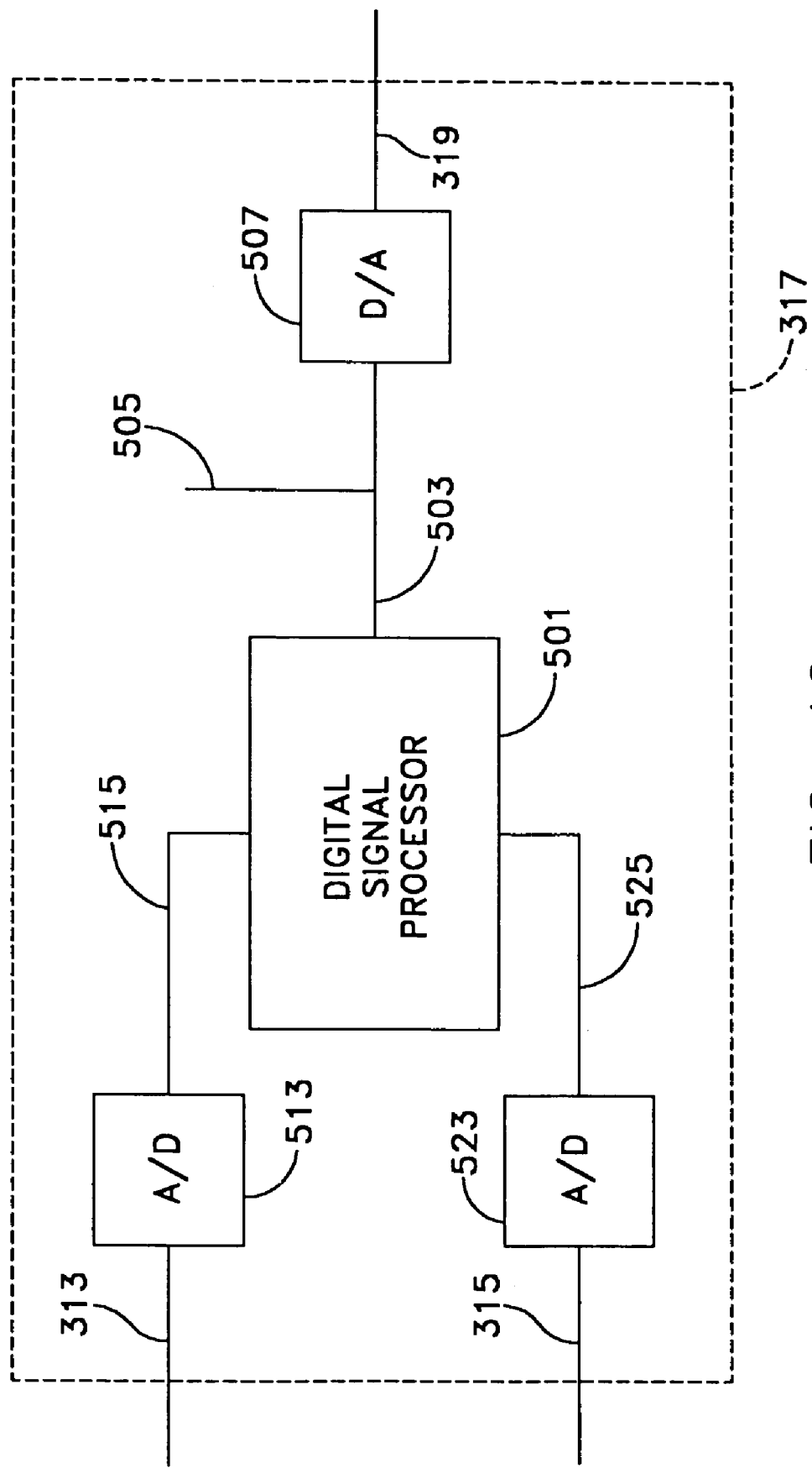
FIG. 10 is a block diagram disclosing details of a digital embodiment of the phase detector component phase demodulator circuit assembly of FIG. 8.

Example implementations of the phase detection 317 of FIG. 8 will now be presented. Refer to FIG. 10. An example digital phase detector implementation, 317, is shown in the block diagram. The signal proportional to $\cos(\Phi_m)$ on electrical path 313 is converted to a digital code or number by analog-to-digital converter (hereafter, A/D) 513. The digital number proportional to $\cos(\Phi_m)$ is input into the digital signal processor 501 via electrical path 515. The signal proportional to $\sin(\Phi_m)$ on electrical path 315 is converted to a digital code or number by A/D 523. The digital number proportional to $\sin(\Phi_m)$ is input into the digital signal processor, 501, via electrical path 525. The digital signal processor converts the numbers proportional to $\sin(\Phi_m)$ and $\cos(\Phi_m)$ into a number proportional to $\Phi_m$ as follows.

Suppose the constant of proportionality for the $\sin(\Phi_m)$ and $\cos(\Phi_m)$ is $V_m$. Then the digital signal processor can optimally select estimates of $\Phi_m$ and $V_m$ to minimize the calculated error function:

$$\epsilon(\hat{\Phi}_m, \hat{V}_m) = ((V_m \cos(\Phi_m) - \hat{V}_m \cos(\hat{\Phi}_m))^2 + (V_m \sin(\Phi_m) - \hat{V}_m \sin(\hat{\Phi}_m))^2) \quad (42)$$

The digital signal processor can also calculate $\Phi_m$ directly by taking the inverse tangent function or the inverse cotangent function:

$$\Phi_m = a \tan\left(\frac{V_m \sin(\Phi_m)}{V_m \cos(\Phi_m)}\right) \quad (43)$$

$$= a \cot\left(\frac{V_m \cos(\Phi_m)}{V_m \sin(\Phi_m)}\right)$$

If desired, the digital signal processor can also implement the differentiate and cross multiply (hereafter DCM) algorithm. The DCM method is as follows. The digital representation of the signals proportional to $\sin(\Phi_m)$ and $\cos(\Phi_m)$ are temporally differentiated and cross multiplied by the non-differentiated signals. The result $U_m(t)$ is integrated to produce the desired output, $\Phi_m$. Mathematically, this algorithm is:

$$U_m(t) = V_m \sin(\Phi_m) \frac{\partial}{\partial t}(V_m \cos(\Phi_m)) - V_m \cos(\Phi_m) \frac{\partial}{\partial t}(V_m \sin(\Phi_m))$$  (44)

$$U_m(t) = V_m^2((\cos(\Phi_m))^2 + (\sin(\Phi_m))^2) \frac{\partial \Phi_m}{\partial t}$$

$$U_m(t) = V_m^2 \frac{\partial \Phi_m}{\partial t}$$

$$\Phi_m = \frac{1}{V_m^2} \int U_m(t) \partial t.$$

The digital signal processor 501 converts the signals arriving on electrical paths 515 and 525 into a digital output proportional to $\Phi_m$ on electronic path 503. Optionally, the digital output is passed on electronic path 505 to some other data sink such as a computer memory. The digital signal proportional to $\Phi_m$ on electronic path 503 is converted back to an analog signal on electrical path 319 by digital-to-analog converter 507. By way of a summarization, the example digital phase detector 317 accepts inputs 313 and 315 which originate from the I & Q demodulator, 311, of FIG. 8, and the digital phase detector 317 outputs the phase signal $\Phi_m$ on electrical path 319. Optionally, any of other well-known implementations of digital phase detectors may be employed.

Figure 11:
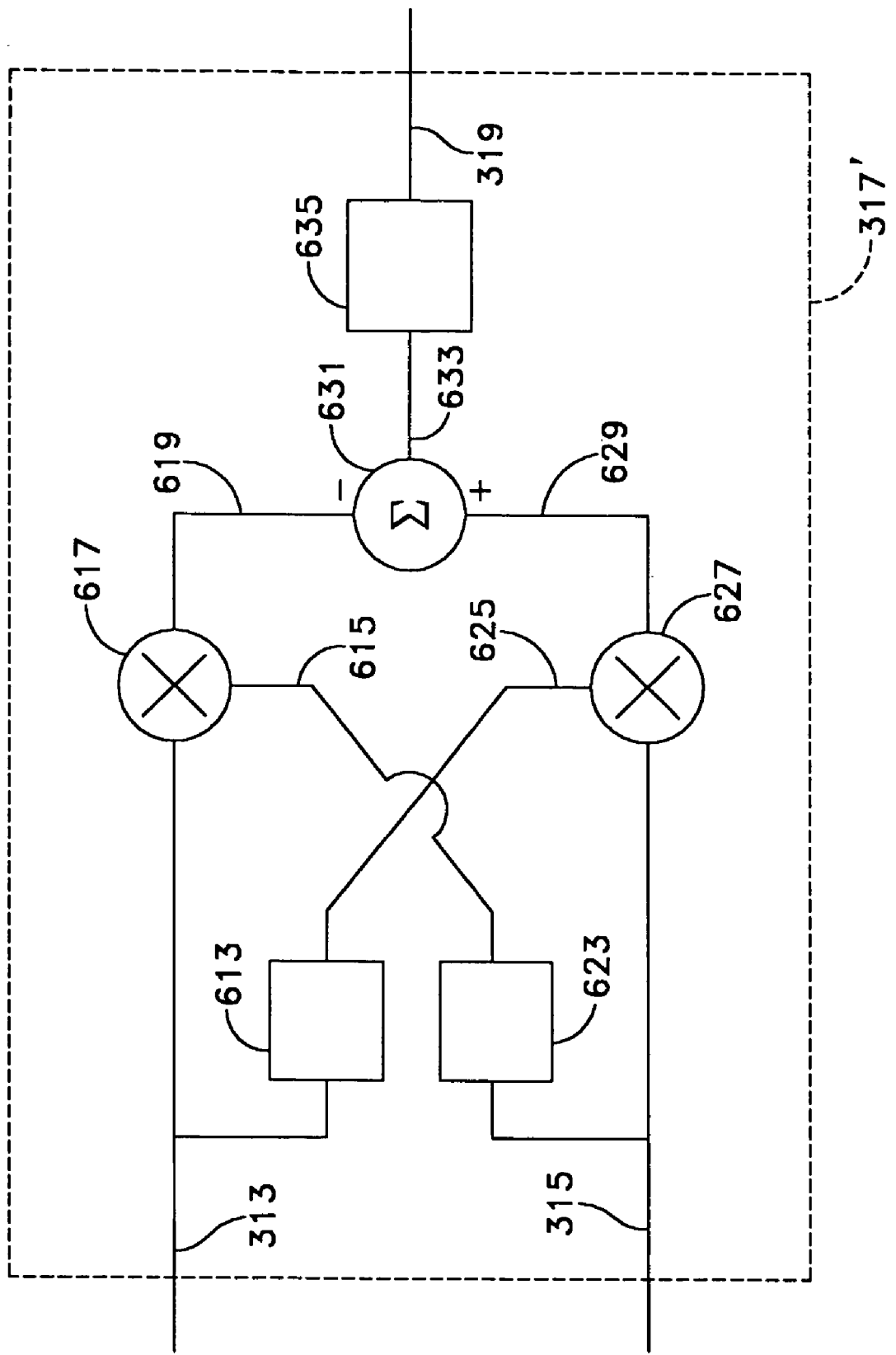
FIG. 11 is a block diagram disclosing details of an analog embodiment of the phase detector component phase demodulator circuit assembly of FIG. 8.

Refer to FIG. 11. An example analog phase detector implementation, 317' is shown in the block diagram. The example analog phase detector 317' shown in FIG. 11 implements an analog version of the DCM algorithm discussed in the previous text. The signal proportional to $\cos(\Phi_m)$ on electrical path 313 is input into analog temporal differentiator 613 and analog multiplier 617. The signal proportional to $\sin(\Phi_m)$ on electrical path 315 is input into analog temporal differentiator 623 and analog multiplier 627. The differentiated cosine term on signal path 625 is multiplied by the sine term on electrical path 315 by analog multiplier 627 producing the signal on electrical path 629. The differentiated sine term on electrical path 615 is multiplied by the cosine term on electrical path 313 by analog multiplier 617 producing the signal on electrical path 619. The signals on electrical paths 619 and 629 are applied as inputs to differential summer 631. The output of differential summer on electrical path 633, which is the result of the differentiated sine and cosine product being subtracted from the differentiated cosine and sine product, corresponds to $U_m(t)$ of the DCM discussion. The signal on electrical path 633 is integrated by analog integrator 635 to produce the analog phase detector output proportional to $\Phi_m$ on electrical path and output 319. By way of summarization, the example analog phase detector 317 accepts inputs 313 and 315 which originate from the I & Q demodulator 311 of FIG. 8, then the analog phase detector outputs the phase signal $\Phi_m$ on electrical path 319. Optionally, any of other well-known implementations of analog phase detectors may be employed.

l. Programmable Phase Difference

Figure 12:
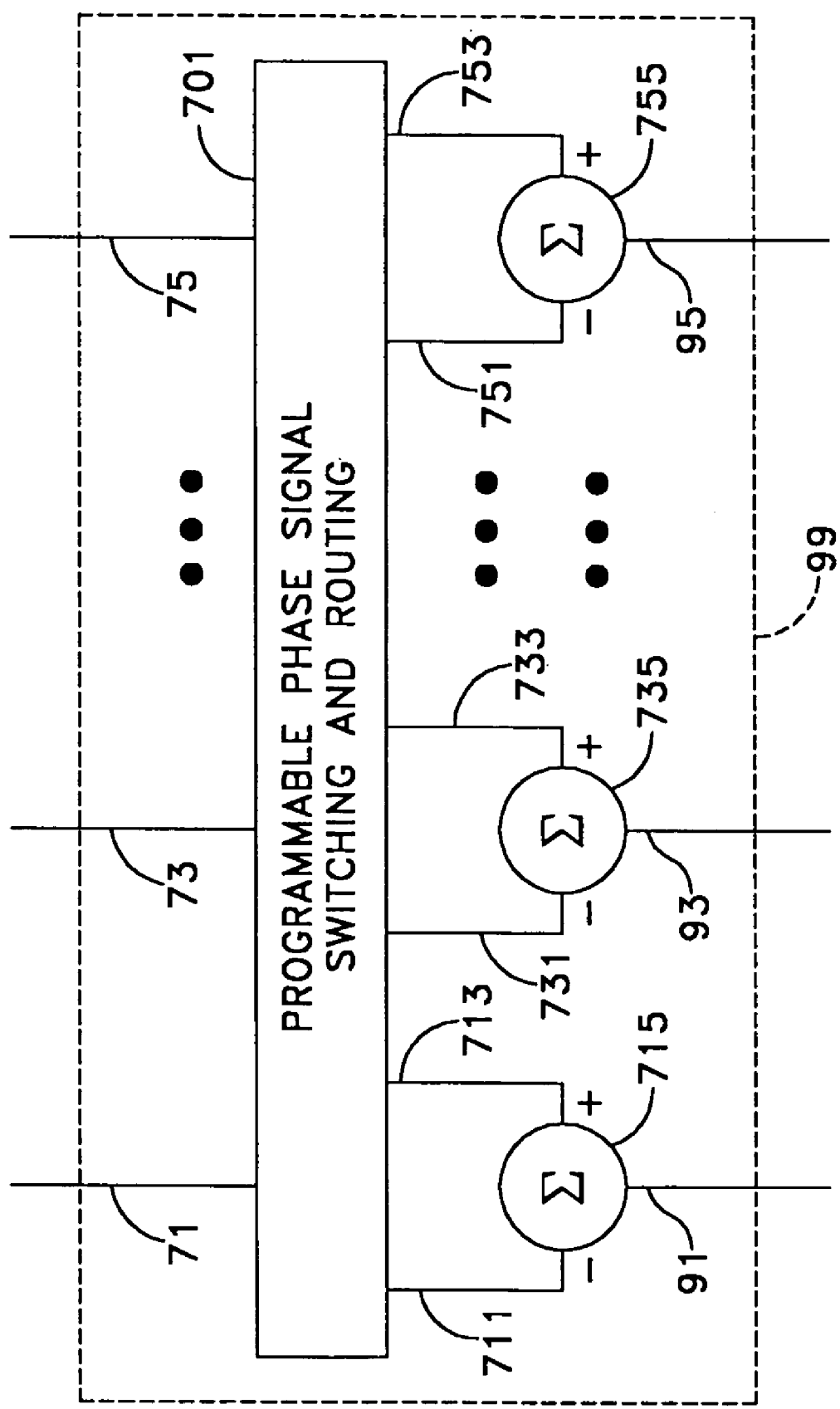
FIG. 12 is a block diagram of a programmable routing and phase signal switching network which provides selective pairing of the outputs of the set of phase demodulators of FIG. 7 to provide differential phase signals across pairs of virtual sensors along the fiber span in accordance with the present invention.

The example programmable phase differencer implementation shown as part 99 of FIG. 12 corresponds to part 99 shown as a block in FIG. 3. Refer to FIG. 12. The plurality (which upwardly may include a very large number, for instance 5,000) of demodulated signals proportional to optical signal phases $\Phi_1, \Phi_2 \ldots \Phi_n$ are input into the programmable phase signal switching and routing network 701 via electrical paths 71, 73 and 75, respectively. Network 701 programmably selects on a basis of timed relation to code generator 53 and routes on a basis of conventional "hold-in memory" and "transfer-from-memory", a plurality (which upwardly may include a very large number, for instance 5,000) of pairs of phase signals onto a plurality (which upwardly may include a very large number, for instance 5,000) of pairs of electronic paths 711 and 713, 731 and 733 and 751 and 753. The plurality of routed pairs of phase signals are applied to the corresponding of subtracters 715, 735 and 755 as shown on FIG. 12. The plurality of phase pairs on electronic pairs of paths 711 and 713, 731 and 733, and 751 and 753 are subtracted by subtracters 715, 735 and 753, respectively, and the differential signal are outputted on a corresponding plurality of electrical paths 91, 93 and 95 respectively. The following description focuses on the differencing channel output on electrical path 91, it being understood that the modes of operation of other differencing channels in network 701 are the same. Programmable phase switching and routing network 701 selects one of the phase signals on one of the plurality of electrical paths 71, 73 or 75 and routes the signal to electrical path 711. The signal on electrical path 711 is selected to be proportional to $\Phi_j$ (where j is of the set 1, 2 . . . n). Network 701 also selects another of the phase signals on one of the other of the plurality of electronic paths 71, 73 or 75 and routes the signal to electrical path 713. The signal of electrical path 713 is selected to be proportional to $\Phi_k$ (where k is of set 1, 2 . . . n). The signal on electrical path 711 is subtracted from the signal on electrical path 713 by subtracter 715. The output of subtracter 715 is passed on via electrical path 91 and is proportional to $\Delta\Phi_{kj}$ hereinabove discussed in subsection 3(f) "Phase Differencing" of this DESCRIPTION OF THE PREFERRED EMBODIMENT. Employing this mode, network 701 programmably makes selection from optical signal phases $\Phi_1, \Phi_2 \ldots \Phi_n$ to provide other differential phase outputs on electrical paths 91, 93 and 95. This may include a very large number of differential phase signals, for instance 5000. As an alternative to the just described type of circuitry employing subtracters 715, 735 and 755 any of other well-known forms of producing a differential signal my be employed.

m. An Alternative Viewpoint of the Partitioning of System 2.

As an alternative to the viewpoint inferable from the preceding sequence discussing FIG. 3, system 2 may be considered as partitioned into: (i) an optical network for illuminating an optical fiber sensing span, or other light propagation medium sensing span, and retrieving back propagating portions-of the illumination; and (ii) a photoelectronic network for establishing virtual sensors at predetermined locations along the span and picking up external physical signals incident to, or impinging upon, the sensors.

In general, the optical network for the illumination of, and for the retrieval of back-propagation from, fiber span 9 comprises transmitter laser 3, directional optical coupler 7, and optical fiber, or other light propagation medium 9.

The photoelectronic network for establishing virtual sensors and picking up signals therefrom generally comprises two subdivisions. One subdivision provides a cyclically reiterative autocorrelatable form of modulation of the light-wave illuminating fiber span 9. This modulation is in the form reiterated sequences having autocorrelatable properties. The other subdivision takes the retrieved back propagation and performs a heterodyning therewith to obtain an r.f. beat signal. It then picks up the signal from the virtual sensors by autocorrelation and further processes it into more useful forms.

In general, the subdivision providing the cyclical reiterative modulation of sequences illuminating fiber span 9 comprises master correlation code generator 53 (via one of its electrical pathway outputs) and optical modulator 5.

In general, the subdivision for performing heterodyning with and picking up of virtual sensor signals from the retrieved back propagation from fiber span 9 includes local oscillator laser 45, and the network which phase locks transmitter laser 3 and local oscillator 45, and a sequence of elements which perform processing upon the retrieved back propagation. The phase locking network comprises beamsplitter 4, phase locking means optical receiver 35, phase locking circuitry 30, and optical coupler 43. First in the sequence of processing elements is an optical receiver 15 which photodetects interference power "derived" by heterodyning the back propagated illumination portion retrieved from fiber span 9 with the output of a local oscillator 45. Lasers 3 and 45 are operated with a frequency difference to produce an r.f. beat signal, $\Delta W$. Then correlation system 23 receives as one of its inputs another electrical pathway output from master correlation code generator 53, and provides a series of channels which in turn respectively provide predetermined time delays in relation to the timing base of cyclic reiterative code generator 53, to perform a series of autocorrelations of the respectively delayed inputs from code generator 53 with the signal $\Delta W$. This picks up r.f. signals respectively representative of the affects in the lightwave domain of the external physical signals incident upon the respective virtual sensor. Phase demodulator system 66 provides a linear phase signal derived from such r.f. signals representative of optical signals at the respective virtual sensors. Programmable phase differencer 99 processes pairs of these linear phase signals occurring across segments of fiber span 9 between programmably selected pairs of the virtual sensors.

Following is another overview description, which more particularly calls attention to an aspect of the invention that the system elements which performs the autocorrelation enable providing an output in the form of an r.f. counterpart of a lightwave time-domain reflectometry output of signals incident to the virtual sensors as lightwave time domain reflectometry outputs a CW lightwave modulated by a continuously reiterated binary pseudorandom code sequence is launched into an end of a span of ordinary optical fiber cable. Portions of the launched lightwave back propagate to the launch end from a continuum of locations along the span because of innate fiber properties including Rayleigh scattering. This is picked off the launch end and heterodyned to produce an r.f. beat signal. The r.f. beat signal is processed by a plurality (which can be thousands) of correlator type binary pseudonoise code sequence demodulators respectively operated in different delay time relationships to the timing base of the reiterated modulation sequences. The outputs of the demodulators provide r.f. time-domain reflectometry outputs representative of signals (e.g., acoustic pressure waves) incident to virtual sensors along the fiber at positions corresponding to the various time delay relationships.

Following is still another overview description which more particularly calls attention to an aspect of the invention that the system elements performing the autocorrelation enable detection of unique spectral components representing a phase variations of external signals incident to the virtual sensors. A CW lightwave modulated by a continuously reiterated pseudorandom code sequence is launched into an end of a span of ordinary optical fiber cable. Portions of the launched lightwave back propagate to the launch end from a continuum of locations along the span because of innate fiber properties including Rayleigh scattering. This is picked off the launch end and heterodyned producing an r.f. beat signal. The r.f. beat signal is processed by a plurality (which can be thousands) of correlator type pseudonoise code sequence demodulation and phase demodulator units, operated in different time delay relationships to the timing base of the reiterated modulation sequences. These units provide outputs representative of phase variations in respective unique spectral components in the r.f. beat signal caused by acoustic, or other forms of signals, incident to virtual sensors at fiber positions corresponding to the various time delay relationships.

Following is yet another overview description which more particularly calls attention to an aspect of the invention-that a pair of the different delay time relationships of the autocorrelation system elements are effective to establish a virtual increment of the optical fiber span, and that a substracter circuit of phase differencer 99 enables representing the differential phase signal across the virtual increment. A CW lightwave modulated by a continuously reiterated pseudorandom (PN) code sequence is launched into an end of a span of ordinary optical fiber cable. Portions of the launched-lightwave back propagate to the launch end from a continuum of locations along the span because of innate fiber properties including Rayleigh scattering. This is picked off the launch end and heterodyned producing an r.f. beat signal. The r.f. beat signal is processed by a plurality (which can be thousands) of correlator pseudonoise code sequence demodulation and phase demodulator units operated in different delay time relationships to the timing base of the reiterated modulation sequences. Pairs of outputs of the units are connected to respective substracter circuits, each providing a signal representative of phase differential of incident acoustic signals, or other forms of signals, across virtual increments of the span established by a pair of said delay time relationships.

n. Air-Backed Mandrel Modified Form of Invention

Figure 13:
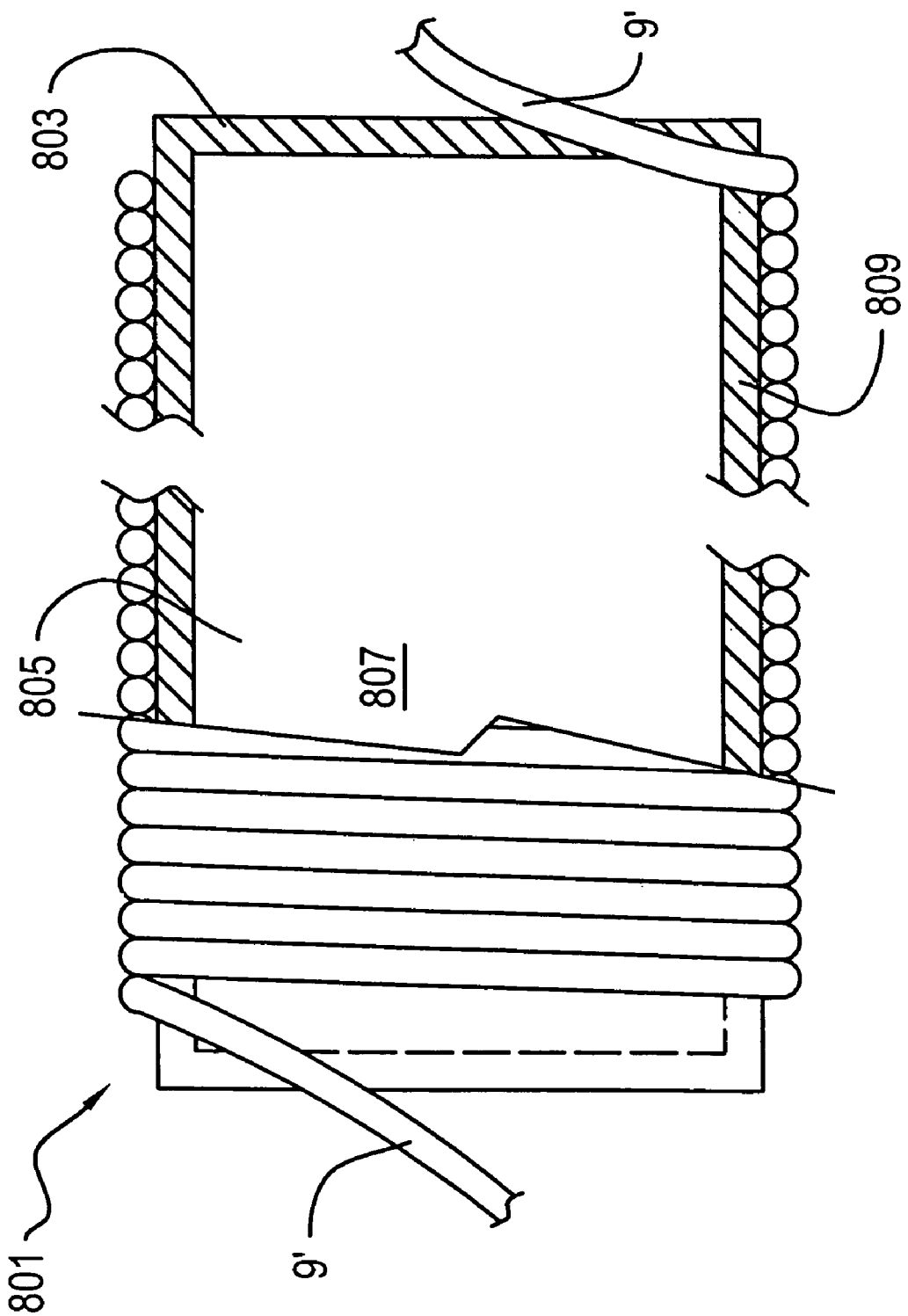
FIG. 13 is a diagrammatic depiction of embodiment of invention of FIG. 3 in which portions of the optical fiber span are wound around a hollow mandrel.

FIG. 13 illustrates a so-called fiber-on-an-air-backed mandrel assembly 801, useful in applications in which a fiber optic span 9' is to be immersed in a liquid medium. Assembly 801 comprises a hollow cylindrical mandrel 803 having formed therein a sealed central chamber 805 containing air or other gaseous medium 807, which is compressible relative to the liquid medium. A segment of span 9' of a ROSE system 2, FIG. 3, is helically wound the cylindrical exterior surface of mandrel 803, and suitably fixedly bonded to the surface. The cylindral wall 809 of mandrel 803 is of a material so chosen and of a thickness so chosen to form a containic membrane with a hoop stiffness that enables acoustic pressure wave signals incident upon assembly 801 to be transformed into mandrel radial dimensional variations. As a result of mandrel 801's geometry these radial variations result in magnified longitudinal strain variations in fiber 9'. It is to be appreciated that the physical structure of assembly 801 inherently provides a spatial succession of two locations along the fiber span, which a phase signal switch and routing network 701 could select and route to become the virtual bounding positions of a differential phase signal virtual sensor. This is to say, positioning a mandrel wound span 9' as a segment of a system total span 9 of ROSE system 2 can facilitate providing a sequential pair of virtual sensor locations along a span 9, and the provision of a corresponding pair of delay circuits in correlator circuit 23 would cause assembly 801 to operate as a differential phase signal sensor.

(4) Advantages and New Features

The invention enables the interrogation or time-delay correlational multiplexing and demultiplexing of optical phase signals.

The invention enables the interrogation of ROSE (Rayleigh Optical Scattering and Encoding) fiber optic sensors. The invention enables the spatial sorting and separation of the temporal optical phases of backscattered optical signals arising from a plurality (which upwardly may include a very large number, for instance 5,000) of virtual optical sensors along fibers or other optical mediums. The invention enables the spatial decoding of backscattered optical signals with a bandwidth of tens of kilohertz. The invention enables the sensor locations along the fiber to be programmable. The invention allows the electronic separation or segmentation of the array of fiber sensors into programmable bounded lengths and positions. Because the correlation signal, c(t), can be designed to be a continuous wave, the invention increases the average optical power considerably over conventional pulsed optical phase sensor interrogation methods. Because the correlation signal c(t) can be chosen to have spectrum spreading properties for which dispreading electronic circuitry is readily available, undesired optical fiber system noises, such as reflection discontinuity noises due to cable couplings, can be materially attenuated.

In hypothetically assessing the potential achievable by the present invention with regard to employment of a common grade of optical fiber cable buried beneath the ground surface as a perimeter intrusion monitoring fiber span, the following assumptions have been made: (i) signal to noise ratio (S/N) degradation of Rayleigh effect light propagation in such an optical fiber cable are assumed to be 0.5 db/km; (ii) it is assumed there is a requirement for bandwidth of ten times that of the geo-acoustic intruder signal needs to be detected; (iii) and digital circuitry functions are performed employing conventional "high end" clock rates. Using these assumptions, and employing conventional single-mode or multimode fiber buried 6-12 inches underground, and using conventional engineering methodology for noise effect prediction, it can be shown that ROSE system 2 has the potential of sensing intruder caused geo-acoustic, (i.e., seismic) signals along a length of fiber span line as long as 8 km or 5 miles. (This assessment is based upon S/N degradations for flyback travel of signals from the interrogation launch end of fiber span 9 to its remote end and back.) The hypothetical segment resolution capability with such a 8 km., or 5 mile line, would be 1 meter.

The invention provides a new capability of heterodyne optical phase detection without resorting to dithered phase carrier methods. The phase demodulation method introduces heterodyne I & Q demodulation to produce cosine and sine phase components, clipped signal amplitude stabilization techniques and digital signal processing based phase detection. The spatially differential phase detection method provided by the invention enables the rejection of unwanted lead-in fiber phase signals.

The details, materials step of operation and arrangement of parts herein have been described and illustrated in order to explain the nature of the invention. Many modifications in these are possible by those skilled in the art within the teachings herein of the invention. For example, while in system 2 the transformation from optical to r.f. signal takes place prior to processing by programmable correlation 23, it is within the skill of the art to design optical receiver 15 and correlator system 23 to have the transformation take place otherwise. Also, as an alternative to the previously described mechanism for phase locking laser 3 and 45, the laser optical wave on an optical path 39 can be passed through an acoustic-optic modulator, sometimes called a Bragg Cell. The diffracted optical wave exiting the acousto-optic modulator will be Doppler shifted by an impinging-driving RF wave, that is translated into a sound wave in the acousto-optic modulator, and the so-called Bragg shifted-diffracted optical wave will exit the acousti-optical modulator with an optical frequency equivalent to the phase locked laser 45. The acousto-optically generated lightwave, at an equivalent frequency of the phase locked laser 45, is sent along optical pathway 13 and becomes the local oscillator input to heterodyne photoreceiver 15. An acousto-optically frequency shifted version of the light in optical path 39 can therefore replace the phase locked light of coherent optical source 45. Accordingly it is to be understood that changes may be made by those skilled in the art within the principle and scope of the inventions expressed in the appended claims.

The invention claimed is:

1. A time-domain reflectometer for sensing at a desired set of n spaced sensing positions along an optical fiber span, said sensing positions being for sensing a type of external physical signal having the property of inducing light path changes within the optical fiber span at regions there along where the signal is coupled to the span, comprising:

an optical fiber span having a first end which concurrently serves as both the interrogation signal input end and the back propagating signal output end for purposes of reflectometry, and having a second remote end;

a first light source for producing a coherent carrier lightwave signal of a first predetermined wavelength;

a binary pseudonoise code sequence modulator modulating said carrier signal for producing a pseudonoise code sequence modulated interrogation lightwave signal which continuously reiterates the binary pseudonoise code sequence, the reiterated sequences being executed in a fixed relationship to a predetermined timing base;

a lightwave heterodyner having first and second inputs for receiving a primary signal and a local oscillator signal, respectively, and operative to produce the beat frequencies of their respective frequencies;

a lightwave directional coupler having a first port which receives said binary pseudonoise code sequence modulated interrogation lightwave, a second port coupled to said first end of said optical fiber span, and a third port coupled to said primary signal input of the heterodyner;

said directional coupler coupling said binary pseudonoise code sequence modulated interrogation lightwave to said second port where it is launched in a forwardly propagating direction along said optical fiber span causing the return to said second port of a composite back-propagating lightwave which is a summation of lightwave back-propagations from a continuum of locations along the length of the span, said composite back-propagating lightwave signal comprising a summation of multiple components including;

a first signal component comprising the summation of portions of the said pseudonoise code sequence modulated interrogation lightwave signal which the innate properties of the optical fiber cause to backpropagate at a continuum of locations along the span; and a second signal component comprising the modulation of said first signal component caused by longitudinal components of optical path changes induced into said span at a continuum of locations along said span by external physical signals, said second signal component further including a corresponding set of subcomponents comprising the modulation of said first signal component by optical path changes caused by said external signals at the respective sensing positions;

said directional coupler coupling said composite back-propagating lightwave to said third port where it is applied to said first input of the heterodyner;

a second light source coupled to said second input of the lightwave heterodyner, said second light source producing a coherent local oscillator lightwave signal in phase locked relation to said carrier lightwave signal, said local oscillator signal being of a second predetermined wavelength which differs from the first predetermined wavelength by an amount of difference small enough to produce at the output of the heterodyner a radio frequency (r.f.) composite difference beat signal, but by an amount large enough to cause said r.f. composite difference beat signal to have sufficient bandwidth to cause it to include r.f. counterparts of signal components and subcomponents of said composite back propagating lightwave signal;

said r.f. composite difference beat signal being coupled to an n-way splitter providing a corresponding set of n output channels, each transmitting said r.f. composite difference beat signal;

a corresponding set of n correlation-type binary pseudonoise code sequence demodulators having their respective inputs connected to the corresponding output channels of said n-way splitter through a corresponding set of time delay circuits which respectively provide a corresponding set of predetermined time delays in relation to said predetermined timing base of the binary pseudonoise code sequence modulator, to establish said n desired sensing positions along said optical fiber span;

said set of correlation-type binary pseudonoise code sequence demodulators serving to conjunctively temporally and spatially de-multiplex said r.f. composite difference beat signal to provide at their respective outputs r.f. counterparts of the subcomponents of said second signal component of said composite back-propagating lightwave signal caused by changes in the optical path within said optical fiber span induced by external physical signals respectively coupled to the corresponding sensing positions; and a corresponding set of n phase demodulators for transforming each respective r.f. counterpart of said second component into a substantially linear signal representative of radian phase of the corresponding lightwave subcomponent signal.

2. The reflectometer of claim 1 wherein:
said innate properties of the said optical fiber material include the generation of Rayleigh optical scattering effects at a continuum of locations along said optical fiber span in response to said forwardly propagating binary pseudonoise code sequence modulated interrogation lightwave.

3. The reflectometer of claim 1 wherein said type of external physical signal which induces light path changes in said optical fiber span is an acoustic pressure wave signal.

4. The reflectometer of claim 3 wherein:
said optical fiber span is an acoustic security alarm perimeter monitoring line buried at a predetermined depth beneath the surface of the ground;

said external physical signal is caused by the vibration of the ground surface by movement of an object thereon; and said set of n sensing positions along the line form a virtual array of n geophones which respectively produce substantially linear signals respectively representative of the vibrations of the surface of the ground at corresponding sensing positions.

5. The reflectometer of claim 3 wherein:
said optical fiber span is of a length L; and
said first light source is a laser having the performance capability to generate a lightwave signal with sufficient phase stability to substantially retain coherency in propagation along said optical fiber span for a distance at least equal to 2L.

6. The reflectometer of claim 5 wherein:
said the length L of said optical fiber span is at least 5.0 km.

7. The reflectometer of claim 3 wherein said optical fiber span comprises a singlemode fiber optic cable.

8. The reflectometer of claim 3 wherein:
said optical fiber span is a perimeter monitoring line of a security system buried beneath the surface of the ground;
said set of n sensing positions along the span serving as perimeter line monitoring stations; and
said outputs of said corresponding set of n phase demodulators providing substantially linear monitoring signals representative of ground vibrations caused by objects moving on the surface of the ground near said optical fiber line.

9. The reflectometer of claim 8 wherein the range of depths of burial of the optical fiber span beneath the surface of the ground is of six inches to the order of one foot.

10. The reflectometer of claim 3 wherein said optical fiber span comprises a fiber optic cable of the polarization preserving type.

11. The reflectometer of claim 3 wherein:
said optical fiber span has a coating made of a thermoplastic material having the combined characteristics of a low Young's modulus and a Poisson's ratio below that of natural rubber;
said coating serving to enhance the longitudinal component of strain variation derived from an acoustic wave signal whose wave front is incident to the span from a direction at least in part having a lateral component in the direction along which the wave front propagates.

12. The reflectometer of claim 1 wherein:
said lightwave heterodyner is of the photodetector type.

13. The reflectometer of claim 12 wherein:
said lightwave heterodyner of the photodetector type is a balanced optical detector circuit including a matched pair of photodetectors with the composite back-propagating lightwave signal applied to each photodetector of the pair; and
said balanced optical detection circuit produces said r.f. composite difference beat signal as a differential current from the matched pair of photodetectors.

14. The reflectometer of claim 1 wherein the continuously reiterated binary pseudonoise code sequences are binary pseudonoise sequences wherein shifts between binary states of the signal alternatingly shift the radian phase of the carrier between substantially 0° and substantially 180°.

15. The reflectometer of claim 1 wherein said pseudonoise code sequence is a pseudorandom number (PN) code sequence generated by a shift-register type PRN code generator.

16. The reflectometer of claim 1 further comprising:
a fixed frequency reference oscillator which produces a reference phase signal;
each phase demodulator including an I & Q quadrature demodulator having a first input for receiving said reference phase signal and a second input for receiving an r.f. counterpart of the corresponding subcomponent of said second signal component of said composite back-propagating lightwave signal, said I & Q demodulator being operative to derive from said reference phase signal an interim in phase signal and an interim quadrature phase signal and to split the signal received at its second input and mix one part thereof with the interim in phase signal and another part thereof with the interim quadrature phase signal to provide a pair of output signals; and
each phase demodulator further including a phase detector having a pair of inputs for receiving respectively one and the other of said outputs of the I & Q demodulator and operative to provide at the output of the phase demodulator said signal representative of the radian phase of the respective subcomponent of said set of n subcomponents.

17. The reflectometer of claim 16 wherein said reference phase signal produced by said fixed frequency oscillator is used in establishing the phase locked relationship between the local oscillator lightwave signal and the carrier lightwave signal.

18. The reflectometer of claim 1 wherein:
a time period TP is required for forward propagation of said autocorrelatable spectrum spreading signal from the output of the source of the spectrum spreading signal to where said first light source is modulated, and then for the forward propagation of the derivative spread spectrum modulated interrogation lightwave signal to the second remote end of the fiber optical span, plus the time period required for the back propagation of a subcomponent of said composite back-propagating CW lightwave signal produced at the remote end of the span to the input of the heterodyner, and then for the back propagation of the derivative counterpart subcomponent of the r.f. composite difference beat signal from the output of the heterodyner to the input of a corresponding de-spreader and de-multiplexer of said set of n de-spreader and de-muitiplexers; and
the temporal length of a single autocorrelatable spectrum spreading signal sequence of the continuously reiterated code sequences is one of one and the other of less than the time period TP, and greater than the time period TP.

19. The reflectometer of claim 1 wherein said type of external physical signal which induces light path changes in said optical fiber span is a selected one of a group consisting of: (i) a seismic signal wherein with the media which couples the signal to said optical fiber span includes at least in part the ground in which the fiber optic span is buried; (ii) an underwater sound signal wherein the media which couples the signal to said optical fiber span includes at least in part a body of water in which the fiber optic span is immersed; (iii) an electromagnetic force field coupled to the optical fiber span; (iv) a signal comprising temperature variations coupled to the optical fiber span; and (v) at least one microphonic signal which is coupled to said optical fiber span at an at least one of said set of n sensing positions along the optical fiber span.

20. The reflectometer of claim 1 wherein each of: (i) said coherent carrier lightwave signal; (ii) said coherent local oscillator lightwave signal; (iii) said spread spectrum modulated interrogation lightwave signal; (iv) said composite back-propagating lightwave signal; (v) said radio frequency (r.f.) composite difference beat signal; and (vi) each counterpart of said r.f. counterpart of the subcomponents of said second signal component of said composite back-propagating lightwave signal, is a continuous wave (CW) signal.

21. A system wherein at respective sensing stations of a plurality of sensing stations along a span of optical fiber, the system senses input signals of a type having a property of inducing light path changes at regions of the span influenced by such signals, comprising:
means for illuminating an optical fiber span with a CW optical signal and for retrieving back-propagating portions of the illumination back propagating from a continuum of locations along the span;
means for modulating the CW optical signal in accordance with a reiterative autocorrelatable form of modulation code;
means for picking off from said retrieved back-propagating portions of the illumination a radio frequency (r.f.) counterpart of the retrieved back-propagated modulated CW optical signal;
means for performing a corresponding plurality of autocorrelation detection processes on said r.f. counterpart of the retrieved back-propagated modulated CW optical signal in respective predetermined timed relationships to said reiterated modulation code; and
means for performing a corresponding plurality of phase demodulation processes upon said r.f. counterpart of the retrieved back-propagated modulated CW optical signal, said demodulation processes performed in phase locked synchronism with said CW optical signal.

22. Signal sensing apparatus for sensing input signals at an array of a plurality of sensing stations along an optical fiber span, wherein at respective sensing stations of the array the apparatus senses input signals of a type having the property of inducing light path changes within at regions of the span influenced by such signals, said apparatus comprising:
an optical wave network comprising a transmitter laser, and a lightwave directional coupler, said network being operative to illuminate an optical fiber span with a CW optical signal and to retrieve portions of the illumination back-propagating from a continuum of locations along the fiber span;
a modulator operative to modulate the CW optical signal in accordance with a reiterative autocorrelable form of modulation code;
a heterodyner which receives said retrieved back-propagated portions of illumination and derives therefrom a radio frequency (r.f.) counterpart thereof; and
a subsystem which receives said r.f. counterpart of the retrieved back-propagated portions of said illumination and is operative to derive signals representative of the phases of input signals respectively influencing the sensing stations of said plurality of sensing stations, said subsystem including;
a corresponding plurality of autocorrelation detectors which respectively detect components of said r.f. counterpart of the retrieved portions of the illumination representative of the optical input signals influencing the corresponding sensing stations; and
a corresponding plurality of phase demodulators which receive respective corresponding detected components of the input signals, said demodulators being operative in phase locked synchronism with said CW optical signal.

* * * * *